United States Patent [19]

Schuetze

[11] Patent Number: 5,675,819

[45] Date of Patent: Oct. 7, 1997

[54] DOCUMENT INFORMATION RETRIEVAL USING GLOBAL WORD CO-OCCURRENCE PATTERNS

[75] Inventor: Hinrich Schuetze, Stanford, Calif.

[73] Assignee: Xerox Corporation, Stamford, Conn.

[21] Appl. No.: 260,575

[22] Filed: Jun. 16, 1994

[51] Int. Cl.$^6$ .............................. G06F 15/38; G06F 15/21
[52] U.S. Cl. ................... 395/760; 395/759; 395/603; 364/220.4; 364/920.4; 364/975
[58] Field of Search ...................... 395/600, 760, 395/759; 364/419.19, 419.11, 419.08

[56] References Cited

U.S. PATENT DOCUMENTS

| | | | |
|---|---|---|---|
| 4,942,526 | 7/1990 | Okajima et al. | 364/419.08 |
| 5,181,163 | 1/1993 | Nakajima et al. | 364/419.08 |
| 5,325,298 | 6/1994 | Gallant | 364/419.19 |

OTHER PUBLICATIONS

"Cluster Algorithm for Vector Libraries Having Multiple Dimensions", IBM Technical Disclosure Bulletin, vol. 37, No. 02A, Feb. 1994, pp. 79–82.

"LSI meets TREC: A Status Report", Susan T. Dumais, NIST Special Publication 500–207, The First Text Retrieval Conference (TREC–1), Mar., 1993, pp. 137–152.

"Full Text Indexing Based on Lexical Relations An Application: Software Libraries", Yoelle S. Maarek et al., Proceedings of the Twelfth Annual International ACMSIGIR Conference on Research and Development in Information Retrieval, Jun. 25–28, 1989, pp. 198–206.

"Dimensions of Meaning", Hinrich Schuetze, Proceedings Supercomputing '92, Nov. 16–20, 1992, pp. 787–796.

Douglas R. Cutting et al., *Scatter/Gather: A Cluster-based Approach to Browsing Large Document Collections*, pp. 1–12, 15th Ann.Int'l SIGIR '92 (1992).

Gerard Salton et al., *Introduction to Modern Information Retrieval*, McGraw–Hill Book Company, pp. 118–155.

Crouch, C.J., "An Approach to the Automatic Construction of Global Thesauri", Information Processing & Management, vol. 26, No. 5, pp. 629–640, 1990.

Deerwester et al., "Indexing by Latent Semantic Analysis", Journal of the American Society for Information Science 41(6), pp. 391–407, 1990.

Evans et al., "Automatic Indexing Using Selective NLP And First–Order Thesauri", Departments of Philosophy and Computer Science Laboratory for Computational Linguistics, Carnegie Mellon University, Pittsburgh, PA, pp. 624–639.

Gallant, Stephen I., "A Practical Approach for Representing Context and for Performing Word Sense Disambiguation Using Neural Networks", Neural Computation 3, pp. 293–309, 1991.

Grefenstette, Gregory, "Use of Syntactic Context to Produce Term Association Lists for Text Retrievel", Computer Science Department, University of Pittsburgh, Pittsburgh, PA, pp. 89–97, 1992.

(List continued on next page.)

*Primary Examiner*—Gail O. Hayes
*Assistant Examiner*—Krishna Kalidindi
*Attorney, Agent, or Firm*—Oliff & Berridge

[57] ABSTRACT

A method and apparatus accesses relevant documents based on a query. A thesaurus of word vectors is formed for the words in the corpus of documents. The word vectors represent global lexical co-occurrence patterns and relationships between word neighbors. Document vectors, which are formed from the combination of word vectors, are in the same multi-dimensional space as the word vectors. A singular value decomposition is used to reduce the dimensionality of the document vectors. A query vector is formed from the combination of word vectors associated with the words in the query. The query vector and document vectors are compared to determine the relevant documents. The query vector can be divided into several factor clusters to form factor vectors. The factor vectors are then compared to the document vectors to determine the ranking of the documents within the factor cluster.

47 Claims, 12 Drawing Sheets

OTHER PUBLICATIONS

Liddy et al., "Statistically–Guided Word Sense Disambiguation", School of Information Studies, Syracuse University, Syracuse, New York, pp. 98–107.

McCune et al., "Rubric: A System for Rule–Based Information Retrieval", IEEE Transactions on Software Engineering, vol. SE–11, No. 9, 1985, pp. 939–945.

Peat et al., "The Limitations of Term Co–Occurrence Data for Query Expansion in Document Retrieval Systems", Journal of the American Society for Information Science 42(5), pp. 378–383, 1991.

Qui et al., "Concept Based Query Expansion", Department of Computer Science, Swiss Federal Institute of Technology, Zurich, Switzerland, pp. 160–169.

Ruge, Gerda, "Experiments on Linguistically–Based Term Associations", Information Processing & Management, vol. 28, No. 3, pp. 317–332, 1992.

Voorhees et al., "Vector Expansion in a Large Collection", Siemens Corporate Research, Inc., Princeton, New Jersey.

Wilks et al., "Providing Machine Tractable Dictionary Tools", Computer Research Laboratory, New Mexico State University, Las Cruces, New Mexico, pp. 98–154.

WordSpace
========

CURRENT QUERY tank artillery

SEARCH RESULT

| 100. | tanks     | 101. | tank       | 102. | artillery   |
|------|-----------|------|------------|------|-------------|
| 103. | armor     | 104. | howitzers  | 105. | armored     |
| 106. | ammunition| 107. | bombardment| 108. | battallions |
| 109. | howitzer  |      |            |      |             |

POOL 0. tank          1. artillery

MENU type a word or list of words to add to the pool

+ <N>    ADD word <N> to pool
- <N>    DELETE word <N> from pool n        retrieve near NEIGHBORS of pool
c        CLUSTER words close to pool
n <N>    retrieve near NEIGHBORS of word <N>
c <N>    CLUSTER words close to <N>
N        get query from DocumentSpace and retrieve near NEIGHBORS
C        get query from DocumentSpace and CLUSTER close words

DocumentSpace
==========

CURRENT QUERY

Japanese American research

SEARCH RESULT 100. miti plans basic research center open to foreign firms
101. new economic institute seeks to aid u.s. companies in global
102. can japan make einsteins too?
103. nations forge plan to share technologies
104. joint u.s.-japan poll finds growing perception gap on trade issue
105. miti forms environmental protection research institute
106. japanese say u.s. computer chip makers failing to meet demand
107. japanese opening research labs in u.s. and luring top scientists
108. washington: administration document.
109. japan trade group fills top post in new york

POOL 0. japanese opening research labs in u.s. and luring top scientists

MENU r <N>   RETRIEVE documents <N>

+ <N>   ADD document <N> to pool
- <N>   DELETE documents <N> from pool n       retrieve near NEIGHBORS of pool
c       CLUSTER documents close to pool
n <N>  retrieve near NEIGHBORS of document <N>
c <N>  CLUSTER documents close to <N>
N       get query from WordSpace and retrieve near NEIGHBORS
C       get query from WordSpace and CLUSTER close documents --->

FIG.4

| RANK | | |
|---|---|---|
| 1 | DOC. I.D. | CORRELATION |
| 2 | DOC. I.D. | CORRELATION |
| ⋮ | ⋮ | |
| n | DOC. I.D. | CORRELATION |

FIG. 17

FACTOR 1

| | |
|---|---|
| $F_{11}$ | DOC I.D. CORR. |
| $F_{12}$ | DOC I.D. CORR. |
| ... | ... |
| $F_{1n}$ | DOC I.D. CORR. |

FACTOR 2

| | |
|---|---|
| $F_{21}$ | DOC I.D. CORR. |
| $F_{22}$ | DOC I.D. CORR. |
| ... | ... |
| $F_{2n}$ | DOC I.D. CORR. |

FACTOR 3

| | |
|---|---|
| $F_{31}$ | DOC I.D. CORR. |
| $F_{32}$ | DOC I.D. CORR. |
| ... | ... |
| $F_{3n}$ | DOC I.D. CORR. |

FIG. 18

| RANK | | |
|---|---|---|
| 1 | min($F_1, F_2, F_3$) | DOC I.D. |
| 2 | min($F_1, F_2, F_3$) | DOC I.D. |
| ... | ... | ... |
| n | min($F_1, F_2, F_3$) | DOC I.D. |

DOCUMENT INFORMATION RETRIEVAL USING GLOBAL WORD CO-OCCURRENCE PATTERNS

BACKGROUND OF THE INVENTION

1. Field of the Invention

This invention relates to improvements in retrieving relevant documents from a corpus of documents. More particularly, this invention determines the co-occurrence patterns of words in a document to form a thesaurus of word vectors.

2. Description of Related Art

Information retrieval systems typically define similarity between queries and documents in terms of a weighted sum of matching words. The usual approach is to represent documents and queries as long vectors and use similarity search techniques. One problem is that a query and a document may share ambiguous words that are used in a different sense. Therefore, a false similarity match could occur (ambiguity problem). A second problem is that the same content may be expressed in different words. Therefore, a short query may miss a relevant document (synonymy problem). If a document is relevant but uses words synonymous to words in the query, the document cannot be found.

One solution is to lengthen the query through relevance feedback. After conducting the first search using an initial query. Additional words are added to the query to narrow the search for the next search iteration.

Another solution is to expand a query through synonym relations as found in thesaurus. A synonym relation is one that finds "closely related words" as opposed to "syntactically and semantically interchangeable words". Thus, the procedure simply maps from one word to other closely related words.

For a thesaurus to be useful in information retrieval, it must be specific enough to offer synonyms for words as used in the corpus of interest. For example, in a corpus of computer science documents, the word "interpreter" would have meanings quite different from everyday language. A thesaurus must also cover all or most of the words found in queries, including the potentially unbounded set of proper nouns.

These two considerations suggest that generic thesauri, which are restricted to common usage, are unlikely to be helpful. Thus, the thesauri must be tuned to the corpus of interest. These might be hand built for a restricted domain or computed from the text of corpus itself.

A thesaurus is a data structure that defines semantic relatedness between words. It is typically used in information retrieval to expand search terms with other closely related words. Even if the thesaurus is not explicitly computed, the mapping performed by query expansion explicitly defines a thesaurus.

The simplest, and perhaps most conventional, approach to thesaurus construction is to manually build an explicit semantic mapping table. This is clearly labor-intensive, and hence only possible in specialized domains where repeated use may justify the cost. For example, the RUBRIC and TOPIC text retrieval systems require a domain expert to prepare a hierarchical structure of "topics" germane to a particular subject area. See McCune et al.; "Rubric, A System for Rule-based Information Retrieval"; IEEE Transactions on Software Engineering 9; pp. 939–44; 1985. Each topic is a boolean combination of other topics and search terms. Searchers then employ terms from this hierarchy to form queries that automatically expand to complex boolean expressions.

Another approach is to reuse existing on-line lexicographic databases, such as WordNet (see Voorhees et al.; "Vector Expansion in a Large Collection"; Proceedings of TREC, 1992.) or Longman's subject codes (see Liddy et al.; "Statistically-guided Word Sense Disambiguation"; Working Notes of the AAAI Fall Symposium on Probabilistic Approaches to Natural Language; 1992 AAAI Press). However, generic thesauri of this sort will often not be specific enough for the text collection at hand. For example, in Voorhees et al., "acts" is expanded with the meaning "acts of the apostles" in a corpus of legal documents. In addition, they frequently do not record information about proper nouns, yet proper nouns are often excellent retrieval cues.

Corpus-based methods perform a computation on the text of the documents in the corpus to produce a thesaurus. For example, a hierarchical thesaurus is formed from a computer list of complex noun phrases where subsumption roughly corresponds to the subset relation defined on terms, e.g., "intelligence" subsumes "artificial intelligence". See Evans et al.; "Automatic Indexing Using Selective NLP and First-order Thesauri"; Proceedings of the RIAO; Vol. 2, pp. 624–43; 1991. While this method is superior to approaches that treat phrase terms as unanalyzed segments, there is no notion of semantic similarity of basic terms. For example, the semantic similarity of "astronaut" and "cosmonaut" is not represented in the hierarchy.

Head-modifier relationships can be used to determine semantic closeness. See Grefenstette, G.; "Use of Syntactic Context to Produce Term Association Lists for Text Retrieval"; Proceedings of SIGIR 1992; pp. 89–97. See Ruge, G.; "Experiments on Linguistically-based Term Associations"; Information Processing & Management 28 (3); pp. 317–32; 1992. This solution is costly since parsing technology is required to determine head-modifier relations in sentences. It is also unclear to what extent words with similar heads or modifiers are good candidates for expansion. For example, adjectives referring to countries have similar heads ("the Japanese/Chilean capital", "the Japanese/Chilean government"), but adding "Japanese" to a query that contains "Chilean" will rarely produce good results.

Semantic relatedness can be determined by considering the occurrence of terms in documents. See Crouch, C.; "An Approach to the Automatic Construction of Global Thesauri"; Information Processing & Management 26 (5); pp. 629–40; 1990. Documents are clustered into small groups based on similarity measure. Two documents are considered similar if they share a significant number of terms, with medium frequency terms preferentially weighted. Terms are then grouped by their occurrence in these document clusters. Since a complete-link document clustering is performed, the procedure is very computationally intensive and does not scale to a large reference corpus. Further, the central assumption that terms are related if they often occur in the same documents seems problematic for corpora with long documents. It also does not capture the intuitive notion that synonyms do not co-occur, but rather have similar co-occurrence patterns.

Crouch constructs thesaurus classes by grouping words into bins of related words. Unfortunately, the boundaries between classes will be inevitably somewhat artificial. If classes are made too small, some words will be cut off from part of their topical neighborhood. If classes are too large, words will be forced into classes with words from different topics. Any particular class size will either separate some words from close neighbors or lump together some words with distant terms.

A thesaurus can be constructed by defining a similarity measure on terms within the document. See Qiu et al.; "Concept Based Query Expansion"; Proceedings of SIGIR 1993. Terms are represented as high-dimensional vectors with a component for each document in the corpus. The value of each component is a function of the frequency the term has in that document. They show that query expansion using the cosine similarity measure on these vectors improves retrieval performance. However, the time complexity for computing the similarity between terms is related to the size of the corpus because the term vectors are high-dimensional. Thus, the method cannot be used on a large scale.

A large-scale singular value decomposition can be used for information retrieval. See Deerwester et al.; "Indexing by Latent Semantic Analysis"; Journal of the American Society of Information Science 41 (6); pp. 391–407; 1990. An improved retrieval performance results by inducing representations for documents that reflect term dependencies and remedy the bumpiness of small counts. However, undetected term dependencies and small counts are a problem if document occurrence is the basis of representation.

The Deerwester method is similar to context vectors, because the LSI (latent semantic indexing) algorithm can compute document and query vectors as weighted sums of term vectors. However, LSI is based on document occurrence. Decomposing a term-by-document matrix of a large collection can take days or even weeks because the time complexity is quadratic in the number of documents to process.

Documents can be represented as vectors whose entries correspond to microfeatures such as finance, animal kingdom, etc. See Gallant, S., I.; "A Practical Approach for Representing Context and for Performing Word Sense Disambiguation Using Neural Networks"; Neural Computation 3 (3); pp. 293–309; 1991. Word vectors are manually encoded for a medium number of words. Then, the document vectors are computed as sums of word vectors. However, this hand-encoding of documents is labor-intensive. Furthermore, the microfeatures chosen or the manual encoding may not accurately reflect the specifics of the document collection.

Machine-readable dictionaries can be used to derive "context vectors." See Wilks et al., "Providing Machine Tractable Dictionary Tools"; Machine Translation; Vol. 5, No. 2, pp. 99–154; 1990. The representation of a word is based on words it co-occurs with in a dictionary rather than a corpus. Context vectors are then computed from these dictionary-based word representations. This method has the same problems as other dictionary-based approaches. In particular, a genre-specific distinction that is not covered in the dictionary is not adequately represented in the dictionary-based representations.

Some researchers argue against the utility of co-occurrence-based expansion. See Peat et al.; "The Limitations of Term Co-occurrence Data for Query Expansion in Document Retrieval Systems"; Journal of the American Society for Information Science 42 (5); pp. 378–83; 1991. Because synonyms often do not occur together, they assert that a co-occurrence-based approach may have difficulty identifying synonymy relations. Furthermore, many researchers use measures for defining closeness that will group words according to frequency. By using these measures, it is impossible for a frequent word to have an infrequent neighbor.

SUMMARY OF THE INVENTION

An object of the invention is to form a new corpus based method for constructing a thesaurus based on lexical co-occurrence of terms in the corpus.

Another object of the invention is using a method for accessing and browsing documents based on content similarity. Words and documents are represented as vectors in the same multi-dimensional space that is derived from global lexical co-occurrence patterns. The method forms an improved retrieval performance for non-literal matches with queries.

The computation of the lexical co-occurrence thesaurus proceeds in two phases. First, the lexical co-occurrence pattern of each word is presented as a multidimensional vector, the thesaurus vector. Second, a similarity measure is induced on words by comparing these vectors. Given a particular word its synonyms are then defined to be its nearest neighbors with respect to the similarity measure. This method of exploiting a lexical co-occurrence structure of words, i.e., forming a word's vector representation from entries of its near lexical neighbors rather than from only itself is superior to conventional methods.

Lexical co-occurrence is more informative both qualitatively and quantitatively. Two terms lexically co-occur if they appear in text within some distance of each other, i.e., a window of k words. Qualitatively, the fact that two words often occur close to each other is more likely to be significant than the fact that they occur in the same documents. Quantitatively, there are more co-occurrence events than occurrence-in-document events in a given document collection. For a word occurring n times in the document collection and for a definition of co-occurrence as occurring in a window of k words, there are nk co-occurrence events. However, there are only n occurrence-in-document events. If the goal is to capture information about specific words, lexical co-occurrence is the preferred basis for statistical thesaurus construction.

Synonyms rarely co-occur. Synonyms tend to share neighbors that occur with both. For example, "litigation" and "lawsuit" share neighbors such as "court", "judge", and "proceedings". A thesaurus represented by lexical co-occurrence patterns defines semantic closeness in terms of common neighbors. Thus, synonyms are not required to co-occur, but they must have similar co-occurrence patterns.

A multi-dimensional continuous space is formed where each word's thesaurus vector represents its individual position. A continuous space does not force a classification choice, and hence avoids some of the ensuing problems.

The dimensionality of the thesaurus space is reduced by using a singular value decomposition. The closeness of terms with equal frequency occurs because the terms have about the same number of zero entries in their term vectors. For a given term, singular value decomposition assigns values to all dimensions of the space, so that frequent and infrequent terms can be close in the reduced space if they occur with similar terms. For example, the word "accident," which may occur 2590 times, and the word "mishaps," which may occur only 129 times, can have similar vectors that are close despite the frequency difference between them. The technique of singular value decomposition (SVD) is used to achieve a dimensional reduction by obtaining a compact and tractable representation for search purposes.

The uniform representation for words and documents provides a simple and elegant user interface for query focusing and expansion.

After forming the thesaurus vectors, a context vector for each document is computed. The context vector is a combination of the weighted sums of the thesaurus vectors of all the words contained in the document. These context vectors then induce a similarity measure on documents and queries that can be directly compared to standard vector-space methods.

Another application for the thesaurus vectors is to divide a query into sub-topics. A vector for each query sub-topic is formed and compared to the document vectors. The document vectors are then scored and ranked by the degree to which they simultaneously match the subtopics of the query.

BRIEF DESCRIPTION OF THE DRAWINGS

For a better understanding of the invention and further features thereof, reference is made to the following detailed description of the invention to be read in connection with the accompanying drawings, wherein:

FIG. 3 shows the query formulation using WordSpace;

FIG. 4 shows the query formulation using DocumentSpace;

FIG. 17 shows the memory locations for the ranking of document vectors by factor clusters;

FIG. 18 shows the final ranking of documents based on the factor cluster ranking.

DETAILED DESCRIPTION OF PREFERRED EMBODIMENTS

While this invention is described in some detail herein, with specific reference to illustrated embodiments, it is to be understood that there is no intent to be limited to these embodiments. On the contrary, the aim is to cover all the modifications, alternatives and equivalents falling within the spirit and scope of the invention as defined by the claims.

Figure 1:
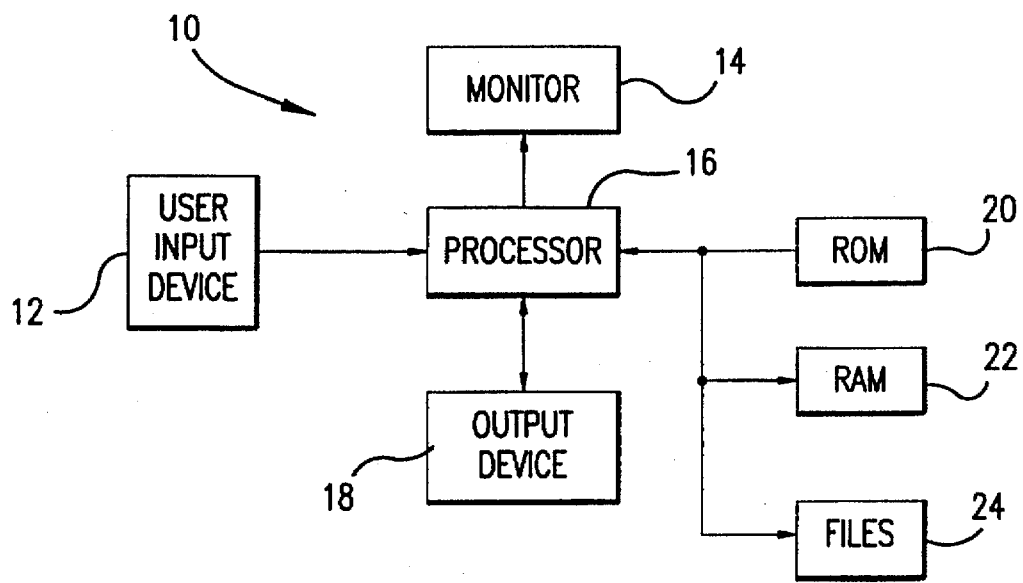
FIG. 1 is a block diagram of an apparatus for determining lexical co-occurrence of terms within a document or query.

FIG. 1 is a block diagram of a preferred embodiment according to the invention of an apparatus 10 for determining lexical co-occurrence of terms within a document or query and forming a thesaurus. The apparatus 10 includes a user input device 12 which includes, for example, one or more of an image scanner (optical or electronic), a keyboard, a touchscreen, a mouse, etc. The image scanner can be a stand-alone device, or part of a facsimile machine or document reproducing machine (copier). A processor 16 is connected to the input device 12 for processing the document image into co-occurrence vectors and comparing the vectors. Processor 16 operates to perform these functions in accordance with operating programs read from read only memory (ROM) 20, and by using random access memory (RAM) 22. Documents can be stored or retrieved from files 24. Processing results and user input information can be monitored on a CRT display monitor 14. After processor 16 has completed processing the documents, the results can be output to an output device 18, which includes, for example, a storage means (hard or floppy disk), a printer, a photocopier, a facsimile machine or a CRT display.

The first preferred embodiment of the invention forms the lexical co-occurrence based thesaurus. Each term of the documents is associated with a vector that represents the term's pattern of local co-occurrences. This vector can then be compared with others to measure the co-occurrence similarity, and hence semantic similarity of terms.

In information retrieval systems such as SMART and SIRE, documents and queries are represented as vectors in term space. See Salton et al.; "Introduction to Modern Information Retrieval"; McGraw-Hill, New York; 1983. These vectors can be represented as an encoding scheme of order-0, which is defined as:

Order-0 encoding for words:

$$\phi_0: V \to R^{|V|} \quad (1)$$

$$\phi_0(w_i) = \vec{a}, a_j = \begin{cases} 1 & \text{if } j = i \\ 0 & \text{otherwise} \end{cases}$$

Order-0 encoding for documents:

$$\psi_0: D \to R^{|V|} \quad (2)$$

$$\psi_0(d_j) = \sum_{1 \leq k \leq |d_j|} \phi_0(t_{j,k})$$

where

V—a set of words;

$w_i$—a word i in V;

$\phi$—word encoding;

D—a set of documents;

$d_j$—a document j in D;

$\psi$—document encoding;

$|d_j|$—the number of tokens in $d_j$; and $t_{j,k}$—the $k^{th}$ token in document $d_j$ The word encoding function $\phi_0$ maps words into a multidimensional space with as many dimensions as there are words. There is no overlap between word vectors. In the order-0 encoding, each word corresponds to a vector with exactly one non-zero weight; that is, one entry for its own dimension. In the simplest case, this weight is one. The representation $\psi(d_j)$ is computed for document $d_j$ by summing up the vectors of all tokens occurring in it.

Similarity between the vector representations for words is measured by the cosine function:

$$\cos(w_i, w_j) = \frac{\sum_{k=1}^{|V|} \phi(w_i)_k \phi(w_j)_k}{\sqrt{\sum_{k=1}^{|V|} \phi(w_i)_k^2 \sum_{k=1}^{|V|} \phi(w_j)_k^2}} \quad (3a)$$

Equation 3a is used to determine topical or semantic similarities between two words.

Similarity between the vector representations for documents is measured by a similar cosine function:

$$\cos(d_i, d_j) = \frac{\sum_{k=1}^{|V|} \psi(d_i)_k \psi(d_j)_k}{\sqrt{\sum_{k=1}^{|V|} \psi(d_i)_k^2 \sum_{k=1}^{|V|} \psi(d_j)_k^2}} \quad (3b)$$

Queries may be viewed as short documents and hence may also be represented as vectors. Search proceeds by searching near neighbors to the query vector in document space. The assumption is that queries and documents are similar to the extent that they contain the same words. However, the same content can be expressed with very different words. Thus, a query and a document could have a similarity measure of zero in this simple scheme even though the query content can be understood as a reasonable description of the topic of the document. This is the problem of synonymy of words. The scheme of order-0 fails to capture synonymy.

Another problem is that a query and a document can share ambiguous words. Thus, the word may be used in a different sense in the document than in the query. In this case, the query and the document may have a high degree of similarity according to a measurement of the cosine function of equation 3b even though the query and the document do not overlap in the intended topic.

The reason for the discrepancy between vector similarity and actual similarity in word content is that the absence or presence of a given word provides little information if words are treated as unanalyzed symbols or indices in term vectors.

In the order-0 scheme, the word vector representation was constructed from one entry for the word. The generalization of order-1 representations is to construct a word vector representation from entries for the word's neighbors in the document collection. These vectors can be represented as an encoding scheme of order-1, which is defined as:

Order-1 encoding for words:

$$\phi_1: V \to R^{|V|} \quad (4)$$

$$\phi_1(w_i) = \sum_{d_j \in D} \sum_{t_{j,k} = w_i} \sum_{|l-k| < W} \phi_0(t_{j,l})$$

Order-1 encoding for documents:

$$\psi_1: D \to R^{|V|} \quad (5)$$

$$\psi_1(d_j) = \sum_{1 \leq k \leq |d_j|} \phi_1(t_{j,k})$$

A vector of order-1 for word $w_i$ is the sum of the vectors of all tokens $t_{j,l}$ that are neighbors of one of the tokens $t_{j,k}$ of $w_i$ in one of the documents $d_j$ in the collection D. Being a neighbor is defined as occurring at a distance of less than W intervening words. A reasonable setting of W is 50 words. So a word is represented as the sum of its neighbors. To make the similarity between the two approaches explicit, an occurrence of a word is defined to be its own neighbor of order-0 and ordinary neighbors are defined to be neighbors of order-1.

Document vectors of order-0 and order-1 are derived in a completely parallel fashion by summation from their respective word vectors.

Synonymous terms have similar neighbors and hence will contribute a similar "direction" in the multidimensional space of document vectors. Ambiguous terms have two different sorts of neighbors. In computing a document vector, those terms that correspond to the sense used in the document will be reinforced whereas the direction represented by the inappropriate sense will not be present in other words. Therefore, order-1 representations can be expected to alleviate the problems of synonymy and ambiguity.

Because the length of an order-1 representation is equal to the number of unique terms in the vocabulary, the order-1 representations are dense and require a lot of storage, which is a severe disadvantage. The order-1 vector of a long document will hardly have any zeros since almost every word is a neighbor of one of the document's terms somewhere in the corpus. In contrast, the order-0 vector of a document has about as many entries as there are words in the document, so it can be stored and processed efficiently.

One solution to this problem is to perform a dimensionality reduction of the order-1 vectors by means of a singular value decomposition, which is disclosed in Deerwester et al. cited above. It can be used to find a linear approximation of the original high-dimensional space (one dimension for each word) in an r-dimensional, reduced space, for an r on the order of $10^2$. The properties of singular value decomposition guarantee that vector similarity in the original space is preserved in the reduced space.

For the purpose of the singular value decomposition, all order-1 representations of the vocabulary V are collected into a $|V| \times |V|$ matrix X such that row i of matrix X contains the order-1 vector of word i, i.e., $\phi_i(w_i)$. Any rectangular matrix (including square matrices such as matrix X) can be decomposed into the product of three matrices:

$$X = T_0 S_0 D_0' \quad (6)$$

such that matrices $T_0$ and $D_0$ have orthonormal columns and matrix $S_0$ is diagonal. This is called the singular value decomposition of matrix X. Matrices $T_0$ and $D_0$ are the matrices of left and right singular vectors, respectively, and matrix $S_0$ is the diagonal matrix of singular values. Singular value decomposition (SVD) is unique up to certain row, column and sign permutations. By convention the diagonal elements of matrix $S_0$ are constructed to be all positive and ordered in decreasing magnitude.

In general, for $X = T_0 S_0 D_0'$ the matrices $T_0$, $D_0$, and $S_0$ must all be of full rank. Singular value decomposition allows a simple strategy for optimal approximate fit using smaller matrices. If the singular values in matrix $S_0$ are ordered by size, the first k largest may be kept and the remaining smaller ones set to zero. The product of the resulting matrices is a matrix $\hat{X}$ which is only approximately equal to matrix X, and is of rank k. It can be shown that the new matrix $\hat{X}$ is the matrix of rank k, which is closest in the least squares sense to matrix X. Since zeros were introduced into matrix $S_0$, the representation can be simplified by deleting the zero rows and columns of matrix $S_0$ to obtain a new diagonal matrix S, and then deleting the corresponding columns of matrices $T_0$ and $D_0$ to obtain matrices T and D, respectively. The result is a reduced model:

$$X \approx \hat{X} = TSD' \tag{7}$$

which is the rank-k model with the best possible least-squares-fit to matrix X.

The approximation of X in the k-dimensional space amounts to a dimension reduction from the original |V| dimensional to the k-dimensional space. The new lower dimensional representations for words are the rows of matrix T. Row i of matrix T is the reduced vector representation of word $w_i$. So all computations can now be done efficiently in the reduced space. Thus, a more compact word representation of order-0 and order-1 are as follows:

Compact order-0 encoding:

$$\phi_0': V_N \to R^{|V_N|} \tag{8}$$

$$\text{for } v_n \in V_N: \phi_0'(v_n) = \vec{a}, \ a_j = \begin{cases} 1 & \text{if } j = n \\ 0 & \text{otherwise} \end{cases}$$

Compact order-1 encoding:

$$\phi_1': V_N \to R^{|V_N|} \tag{9}$$

$$\text{for } v_n \in V_N: \phi_1'(v_n) = \sum_{d_j \in D} \sum_{t_{j,k}=v_n} \sum_{|l-k|<W} \phi_0'(t_{j,l})$$

Reduced order-1 encoding:

$$\phi_1'': V_N \to R^r \tag{10}$$

where $V_N$ is N most frequent content words; $v_n$ is word n in $V_N$; and r are the dimensions of the reduced space.

A singular value decomposition is an expensive operation. Therefore, compact representations can only be derived for a small part of the vocabulary using singular value decomposition. Let N be the number of words for which a singular value decomposition is feasible given the computational means available in a particular setting. For a large workstation, N is about 5,000. Then the derivation of compact representations for the whole vocabulary proceeds in two steps.

In the first step, an order-1 representation $\phi_1'$ is derived using a restricted vocabulary of N words, and a singular value decomposition computes a low-dimensional encoding $\phi_1''$ and $\phi_1'$ are calculated using equations 8–10. The definitions for encoding words are analogous to those in equations 1–2 and 4–5 except that the restricted vocabulary $V_N$ containing the N most frequent content words is used.

In the second step, the representations for the total vocabulary are computed by summing up the reduced order-1 vectors of all neighbors of a given word. The following equation represent order-2 encoding.

Order-2 encoding for words:

$$\phi_2: V \to R^r \tag{11}$$

$$\phi_2(w_i) = \sum_{d_j \in D} \sum_{t_{j,k}=v_n} \sum_{|l-k|<W} \phi_1''(t_{j,l})$$

Order-2 encoding for documents:

$$\psi_2: D \to R^r \tag{12}$$

-continued $$\psi_2(d_j) = \sum_{1 \le k \le |d_j|} \phi_2(t_{j,k})$$

Since order-1 vectors are based on word neighbors, the representation for a word $w_i$ that is derived in this way contains information about the neighbors of the neighbors of $w_i$ in the document collection. Therefore, it is called a representation of order-2. Similar to the order-0 and order-1 functions ($\psi_0$ and $\psi_1$), order-2 function $\psi_2(d_j)$ is computed by summing up the vectors of the tokens occurring in $d_j$. The order-2 representations may contain slightly more information than the order-1 representations for tasks like resolving synonymy and ambiguity, but the iteration is mainly done to restrict the vocabulary to a size that can be managed by the dimensionality reduction.

The sum of all words in a document is a good topic descriptor for short documents. However, long documents tend to contain words from different topics. If too many topics enter in the computation of a document vector, then the document vector will be in a region that is at an intermediate distance to all its topics, but not particularly close to any of them. Thus, any fine distinctions between topics are lost. More precisely, the space of word vectors can be viewed as the surface of a partial hypersphere in a multidimensional space that is centered around the global centroid. In computing a document vector according to the summation formula of equations 11 and 12, each addition of a word that is not related to the document's major topic, and therefore located "on the opposite side" of the global centroid, will push it towards that centroid. Vectors in the area of the global centroid are equally close to everything. Therefore, these vectors are of limited utility in information retrieval. This problem is not particular to higher-order representations.

A computationally simple approach to segment long documents is to cluster the set of tokens in a document into a set of coherent subtopic clusters. A token is a single item in full text. For example, the word "the" appears several times in a document as a token. A linear-time clustering algorithm such as Buckshot (Cutting et al. 1992) can be used. See Cutting et al.; "Scatter-gather: A Cluster-Based Approach to Browsing Large Document Collections"; Proceedings of SIGIR 1992. See also U.S. application Ser. No. 07/790,316 to Pedersen et al., which is incorporated herein by reference.

The Buckshot method, which employs three subprocedures, will be described briefly. The first subprocedure, truncated group average agglomerate clustering, merges disjoint document sets, or groups, starting with individuals until only k groups remain. At each step the two groups whose merger would produce the least decrease in average similarity are merged into a single new group.

The second subprocedure determines a trimmed sum profile from selected documents closest to a document group centroid. Given a set of k document groups that are to be treated as k centers for the purpose of attracting other documents, it is necessary to define a centroid for each group. Documents far from the centroid are trimmed out to determine better focussed centers, and hence to more accurately assign individual documents in the third subprocedure.

The third subprocedure assigns individual documents to the closest center represented by one of these trimmed sum profiles.

Figure 2:
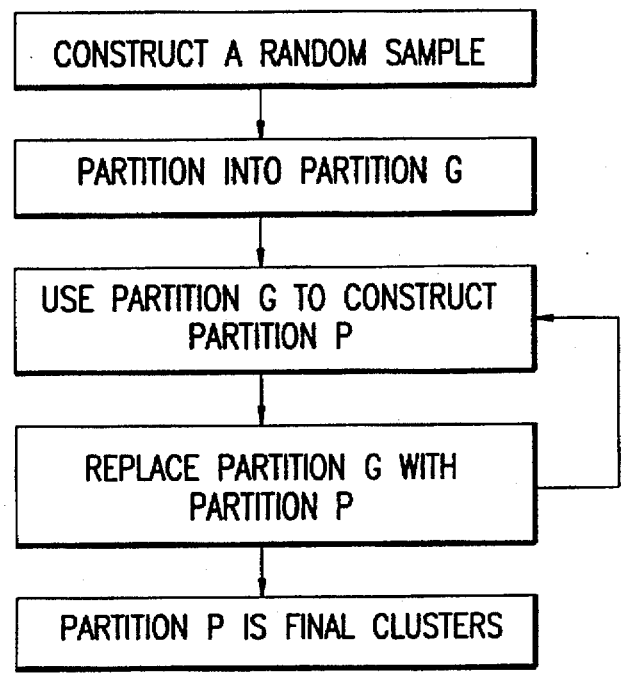
FIG. 2 is a flow diagram of the Buckshot clustering algorithm.

Referring to FIG. 2, the steps of the Buckshot method are shown. In step 30, a random sample of C' is constructed from corpus C of size $\sqrt{kN}$. The sampling is performed without replacement. In step 32, sample C' is partitioned into k groups by truncated group average agglomerative clustering. This partition is called partition G. In step 34, partition P is constructed from corpus C by assigning each individual document to one of the centers in partition G. This is accomplished by applying assign-to-nearest over the corpus C and the k centers of partition G. In step 36, partition G is replaced with partition P. Steps 34 and 36 are repeated once. In step 38, partition P is the new corpus.

After clustering the document, each document can then be described by the centroids of its subtopic clusters. The derivation of the structured document representations of order-2 are:

Order-2 clustering function:

$$\gamma: D \times C \to P(V) \forall c_1, c_2 \; \gamma(d_j, c_1) \cap \gamma(d_j, c_2) = \Phi \quad (13)$$

$$\cup_{c \in C} \gamma(d_j, c) = \{t_{j,k} \text{ for } 1 \leq k \leq |d_j|\}$$

Order-2 encoding function:

$$\psi_2': D \times C \to R^r \quad (14)$$

$$\psi_2'(d_j, c) = \sum_{(1 \leq k \leq |d_j|) \wedge (t_{j,k} \in \gamma(d_j, c))} \phi_2(t_{j,k})$$

where γ partitions the corpus of documents D into subtopic clusters C; and $\psi_2'$ assigns centroids of subtopic clusters to documents. The partitioning function makes sure that words pertaining to different topics remain separated in different clusters, thus avoiding document vectors that are too close to the global centroid.

An example of vector representation of each document will be next described by using the user interface TwinSpaces. TwinSpaces uses the methods of thesaurus vectors and document vectors defined in this application. TwinSpaces has two parts: WordSpace (generation of word vectors) and DocumentSpace (generation of document vectors).

TwinSpaces is ideal for a user who has a clearly defined information need, but who may not be fully aware of the vocabulary that is used for the topic of interest in the document collection. For example, a journalist who is doing research on an article is only interested in documents related to the topic of the article. But there are many pieces of information that are relevant, yet cannot be searched for, because the journalist doesn't know about them yet. Thus TwinSpaces is ideal for this type of search, which is intermediate between literal retrieval and simply browsing all of the documents.

WordSpace is based on a corpus of 50 million words corresponding to 18 months of the New York Times newswire. By using the order-2 scheme, 55,000 word vectors are computed.

An alternative method is to compute vectors for 5,000 letter fourgrams instead of words in iteration 1 (for $\psi_1'$). A fourgram is a sub-word fragment of four letters. For example, the word "package" is divided into fourgram fragments of "pack", "acka", "ckag", and "kage". There are fewer fourgram combinations than there are words in the English language. The dimensionality of the fourgram space was reduced to r=97 using singular value decomposition.

The informational significance of individual terms can be evaluated by looking at their nearest neighbors. Table 1 shows ten randomly selected words and their nearest neighbors in order-2 space: average (financial markets); Eschenbach (classical music); gill (fishing); Indonesians (South East Asia); markup (retailing); Novell (computer industry); pleaded (court proceedings); rags (fashion); shriveled (cooking) and Societies (political organizations). The topical characteristics of the selected words are obvious from looking at the few nearest neighbors given. For the words "average" and "rags," the user has to look at 30 neighbors to get a clear sense of their topics (the financial markets and fashion, respectively). The neighbors of the word "Societies" suggest that it is related to political and religious organizations, but no clear topic emerges. This indicates that the word is an ambiguous and, consequently, less useful search term.

Higher-order representations for words thus make possible a novel type of user interface for information access. In traditional information retrieval systems, it is hard to assess the impact of the terms used in a query. The user communicates with the system on the level of document descriptions. In the case of relevance feedback, one specifies which documents returned as response to the original query should be the basis for the next search iteration. Communication in terms of documents is difficult. Document titles are often uninformative or do not represent crucial parts of the content of a document. It also takes a relatively long time to read and evaluate them with respect to the user's information needs.

In systems based on order-0 representations, the user can only assess the impact of search terms indirectly by analyzing the retrieval results for varying search terms. In contrast, the higher-order word representations provide a simple and elegant user interface for evaluating the significance of search terms. A look at their nearest neighbors is usually sufficient to get a good idea of the topic that the word pertains to as demonstrated in Table 1.

With higher-order word representations, the user examines nearest neighbors as direct diagnostics for each individual term, thereby composing a query that matches the information needs of the user more closely. A word "shriveled" that may have been intended as a description of dry, old skin can be replaced by a related word that is used in the document collection to express the intended concept. The user can also check whether a proper name like "Eschenbach" is used for a specific person in the corpus (here it is the conductor Christopher Eschenbach). If there were a tennis player of the same name, then it would make Eschenbach less useful in a search for documents on classical music.

Query formulation and refinement in WordSpace uses the sample layout of FIG. 3. A query is shown in the section CURRENT QUERY. These words are collected in the pool of words to be examined in the section called POOL. The user can add or delete words from this pool depending on the output of the search. The commands shown in the MENU section are used to form and process the query in WordSpace.

The crucial operation of the user interface is retrieval of nearest neighbors, either a small number (e.g. 10) that is presented directly for inspection, or a large number that is clustered and presented to the user in digested form. Individual words or the whole pool can be evaluated by looking at their nearest neighbors. The nearest neighbors of the pool (tank, artillery) are printed in the section SEARCH RESULT. By inspecting these neighbors, the user can make sure that the "receptacle" sense of the word "tank" will not interfere with a query on military equipment.

A clearly ambiguous word like "tank" can be clarified to narrow the search. Table 2 shows ambiguity resolution with word vectors of order-2. The nearest neighbors suggest that higher-order vectors deal with ambiguity and synonymy to some extent, even without user interaction. The example of "tank" shows that the information present in higher-order vectors can be used to resolve ambiguity, which is one of the main problems for representations of order-0. In order-0 retrieval, the undesired sense of an ambiguous search term may lead to the retrieval of documents that are not related to the query.

Table 2 shows that the word "tank" can be disambiguated both ways in WordSpace. A query consisting of the terms "tank" and "water" retrieves only words relevant to the "receptacle" sense of the word "tank." The query consisting of the terms "tank" and "artillery" is apparently located in a part of the space that corresponds to the "armored vehicle" sense used in FIG. 3.

An order-0 retrieval system will only do well on documents that contain both the ambiguous and the disambiguating term, but it will give the same ranking to documents that contain only one of them (e.g. only water or only tank). The nearest neighbors in Table 2 suggest that a higher-order system would remedy this situation. If the word "tank" occurs in two documents, but water doesn't, the document containing words related to water (such as pipes or flush) will be rated higher than the one pertaining to a different topic.

The generalization to higher-order representations also addresses the problem of synonymy. In order-0 retrieval, the occurrence of the word "coast" in one document and the use of its synonym "shoreline" in a related document will not increase the similarity of the two documents. The higher-order scheme can exploit synonymy since "coast" and "shoreline" have similar neighbors. Therefore, their higher-order vectors will contribute a similar direction in the multidimensional space to their respective document vectors, which in turn makes the document vectors more similar. Table 2 gives two examples of words whose synonyms have almost identical direction in the multidimensional space.

DocumentSpace, which is the second part of TwinSpaces, contains 34,000 articles from the New York Times newswire between the months of June and November of 1990. Each document vector was computed according to equations 11 and 12, as the sum of the vectors of all its tokens.

FIG. 4 shows the user interface for DocumentSpace, which is parallel to the user interface for WordSpace. The user interface has functions for adding to and deleting from the pool and for looking at the nearest neighbors of the pool or an individual document. The current query in WordSpace can be used to start a search in DocumentSpace.

The query "Japanese American research" was performed using DocumentSpace. In the SEARCH RESULT section of FIG. 4, the ten top ranking documents are shown. These documents seem to conform well with the query although there are few literal matches. In fact, a retrieval method based on literal matches would do badly on a query that contains such general terms. Because of DocumentSpace's independence from literal matches, it also does well even on one-word queries.

There is a benefit of the parallel design of WordSpace and DocumentSpace. For a query consisting of words, the topic and content of a document can be described by its near neighbors in WordSpace, in complete analogy to the retrieval of document neighbors in DocumentSpace. Table 3 shows the titles of five random and one selected document. Table 4 displays the nearest neighbors of the articles displayed in Table 3. These nearest neighbors show that the neighborhood of a document in the space of word vectors is a good characterization of its topic for short, topically focused documents.

By reviewing the information in tables 3 and 4, the user sees that documents 132, 14387, and 4579 are one-topic documents that are represented by words that characterize their content. Documents 13609, 22872, and 27081 are long documents with more than one topic. Therefore, their document vectors are closer to the global centroid. Their nearest neighbors are function words, because function words share the characteristic of having a large number of words from different topics as their neighbors.

A good characterization is achieved for all documents with the structured representations of equations 13 and 14. Such a characterization makes the user less dependent on well chosen document titles. It is easier to process than a long title, particularly if only the coarse topic of a document is of interest. In general, the nearest neighbors provide additional information on the content of a document that can be used for document selection or relevance feedback.

The randomly selected words in Table 1 were used as queries in DocumentSpace to demonstrate the information present in the word vectors of order-2. Appendix A shows the ten highest ranking documents for each query term in Table 1. With the exception of Societies, the document titles generally correspond to the topic described by the nearest neighbors of the query term. The cause for the religious articles retrieved for Societies may be the use of this term in the phrase "Center for Religion and Human Rights in Closed Societies." But the mismatch between word neighbors and document neighbors is only a problem if Societies is used as a search term although its word vectors suggest a topically mixed neighborhood.

The first preferred embodiment described above is a rich representation of words and documents that is based on global information about the document collection. The first preferred embodiment is superior to the literal representation used in classical vector similarity search. In the invention, the representation of words provides a user interface for understanding and manipulating word-word, word-document, and word-query relations. The representation of documents gives rise to a similarity measure that reflects topical relatedness better than a scheme based on literal matches.

The first preferred embodiment requires the formation of a co-occurrence-based thesaurus, which is formed by computing and collecting a (symmetric) term-by-term matrix C. Each element $c_{ij}$ of matrix C records the number of times that words i and j co-occur in a window of size k. For example, the window k can be forty or fifty words. Topical or semantic similarity between two words can then be defined as the cosine between the corresponding columns of the matrix C as defined in equation 3a. The assumption is that words with similar meanings will occur with similar neighbors if enough text material is available.

The matrix C has $v^2/2$ distinct entries, where v is the size of the vocabulary. Although this matrix is sparse, v is expected to be very large. Therefore, the overall storage requirement needed to form the co-occurrence thesaurus is unworkable.

Even if enough memory were found to represent the matrix C directly, the thesaurus vectors associated with each word (columns of the matrix C) would be v-dimensional. Although these vectors are somewhat sparse, this implies that word comparisons are an order v operation, which is prohibitively expensive for large scale application.

Thus, the dimensionality of the problem must be reduced to a workable size by using a singular value decomposition of a matrix of co-occurrence counts. However, this matrix must be constructed in a series of steps to keep the computations tractable at each state.

The construction of the thesaurus will be described with reference to FIGS. 5–9. The goal is to apply a singular value decomposition to reduce the dimensionality of the matrix in a disciplined fashion and in the process produce more compact representations. However, the time to perform the singular value decomposition is proportional to $n^2$, where n is the dimensionality of the matrix. Thus, the dimensionality of the matrix fed into singular value decomposition cannot be too high. In particular, the original matrix C cannot be used. Instead, a two stage computation is performed that derives two sets of topical word classes from the corpus: 200 word clusters of low coverage; and 200 word clusters of high coverage. Thus, the dimensionality of the matrix is preserved without sacrificing too much information.

Figure 5:
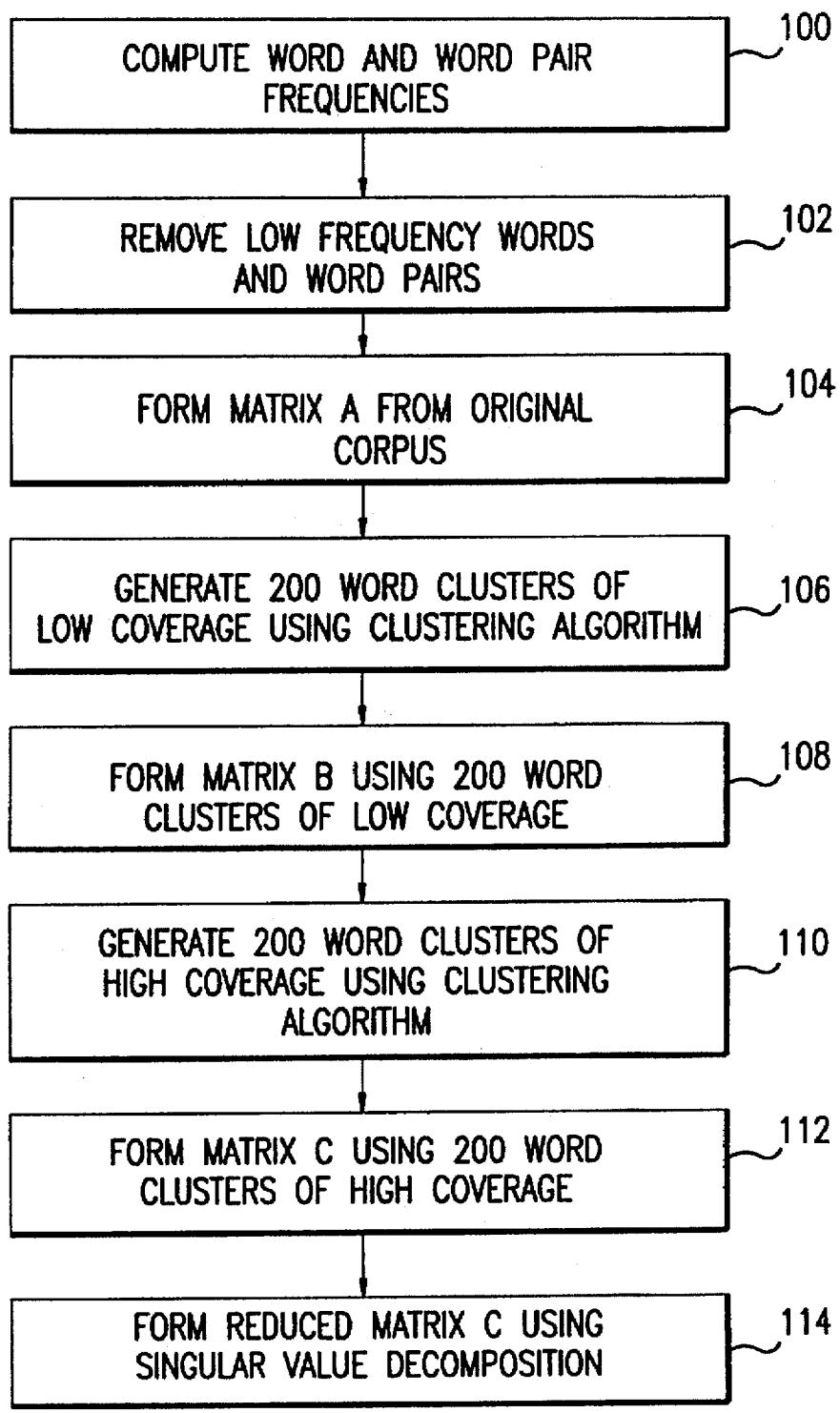
FIG. 5 is a flow diagram for computing the word vectors for the thesaurus.

The topical word classes agglomerate information over similar words. In FIG. 5, step 100 computes the word and word pair frequencies in the corpus. A word pair is two consecutive words in the corpus. For example, the title "The Journal of Computer Science" has four word pairs: The Journal; Journal of; of Computer; and Computer Science.

In step 102, words and word pairs of low frequency are dropped from consideration. For example, any word with a frequency of one and any word pair with a frequency of less than five are not important. The word pair "computer science" will appear throughout the text. Therefore, it will probably appear more times than the other three word pairs, which will only appear in the title.

Figure 6:
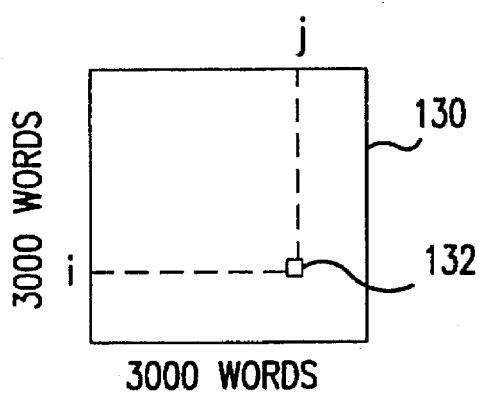
FIG. 6 shows the Matrix A computed in the flow diagram of FIG. 5.

In step 104, the Matrix A is formed from the original corpus. The full co-occurrence matrix is constructed for a subset of terms in the corpus. For example, 3,000 medium frequency words (frequency ranks 2,000 through 5,000) are chosen for this subset. FIG. 6 shows Matrix A with the dimensions of 3000 words by 3000 words. Element $a_{ij}$ of the matrix records the number of times that words $w_i$ and $w_j$ co-occurred in a window of 40 words in the text collection.

Step 106 forms the first set of topical word classes by clustering Matrix A into groups. The clustering algorithm is based on the cosine similarity between the columns of matrix A. For example, 200 A-classes $g_{A1}, g_{A2}, \cdots g_{A200}$ using group average agglomerative clustering are found. These 200 word clusters are considered low coverage clusters. The Buckshot method is one example of a method to cluster the groups.

Figure 7:
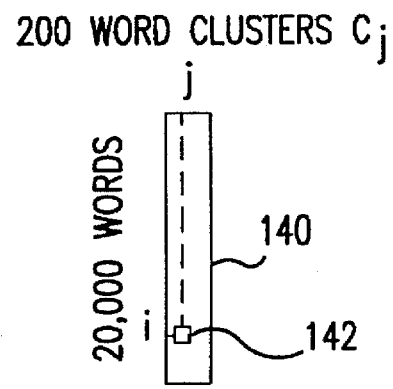
FIG. 7 shows the Matrix B computed in the flow diagram of FIG. 5.

A second matrix B is formed in step 108 by considering a larger vocabulary subset. For each word in this larger B-subset, matrix B records the number of times words in each A-class occur in neighborhoods around that B-subset word. Each element $b_{ij}$ records the number of times the $w_j$ co-occurs with any of the medium-frequency words from class $g_{Ai}$. This is similar to the usual co-occurrence matrix construction except that the matrix is no longer symmetric. FIG. 7 shows Matrix B, which has rows corresponding to A-classes, i.e., columns to words. For example, the B-subset contains the 20,000 most frequent words, excluding stop words.

In step 110, this B-subset is again partitioned into 200 word classes by clustering the columns of matrix B. The purpose of this second iteration is to ensure that each word in the corpus has a sufficient number of neighbors from at least one word class. If only A-classes is used, then many words would have no co-occurrence events. In contrast, every word co-occurs with several words in the B-subset and hence will have many co-occurrence events with respect to B-classes. The 200 word clusters ($g_{B1}, g_{B2} \cdots g_{B200}$) generated are of high coverage. The Buckshot method is one example of a method to cluster the groups.

Figure 8:
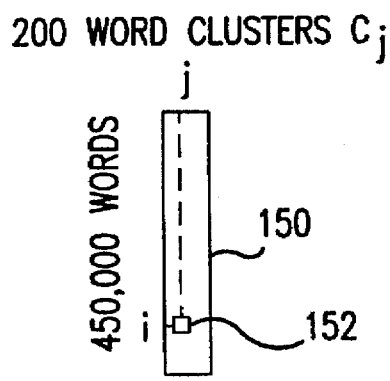
FIG. 8 shows the Matrix C computed in the flow diagram of FIG. 5.

In step 112, a third co-occurrence matrix C is collected for the full corpus vocabulary versus the B-classes. Thus, a matrix is formed having the full vocabulary versus a representative of the full vocabulary. Element $c_{ij}$ contains the number of times that term j co-occurs in a window of k words with any word in class $g_{Bi}$. Referring to FIG. 8, matrix C has b rows and v columns. For example, all 176,116 words that occurred at least twice in the collection are used and all 272,914 pairs of adjacent words that occurred at least 5 times, for a total of 449,030 unique terms.

Figure 9:
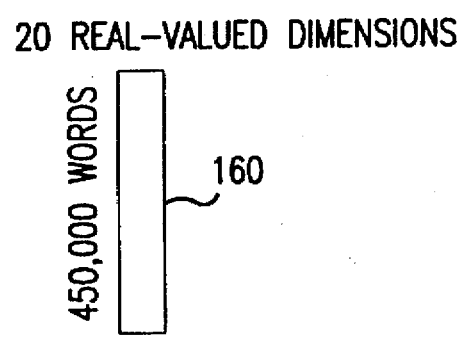
FIG. 9 shows the reduced Matrix C computed in the flow diagram of FIG. 5.

At step 114, a singular value decomposition dimensionality reduction to p (p<b) is performed so that each of the v terms can be represented as a compact p dimensional vector and also to improve generalization. The reduced matrix C is shown in FIG. 9.

To reduce compute time in the example, only a subset of the matrix, corresponding to the 1000th through 6000th most frequent word, was decomposed. This decomposition defined a mapping from the 200 dimensional B-class space to a 20 dimensional reduced space. By applying the mapping to each of the 449,030 200-component B-class vectors, a smaller 20-dimensional vector was computed for each word and pair.

Note that the final reduction in dimensionality was performed because smoothing and improved generality results from a singular value decomposition reduction. Similarity between b-component vectors can contain a large error measure of semantic similarity since there may be several word classes with similar topics. For example, class $g_{B4}$ contains words like "navy", "radar", and "missile", while some of the member of class $g_{B47}$ are "tanks", "missiles", and "helicopters". If one of two words has many neighbors in $g_{B4}$ and the other has many in $g_{B47}$, then they would not be similar in the 200-dimensional space; but they are similar in the reduced space. This is because the singular value decomposition algorithm recognizes and eliminates such redundancies.

Four passes through the corpus are required to complete the computation. The first pass computes word and word pair frequencies. The second pass computes Matrix A and the A-classes. The third pass computes Matrix B and the B-classes. Finally, the fourth pass computes Matrix C. In addition, Matrix C is decomposed by using singular value decomposition to compute the thesaurus vectors.

If the Tipster Category B corpus is used, each pass through the corpus takes roughly six hours (includes CPU and I/O time). Tipster is a corpus of documents controlled by the government (NIST-National Institute of Standards and Technology) to further information retrieval methods. Note that these computations could have been accelerated by using loosely coupled coarse-grained parallelism to effect a linear reduction in compute time. The singular value decomposition requires roughly 30 minutes to compute.

The net effect of this computation is to produce for each unique term a dense p-dimensional vector that characterizes its co-occurrence neighborhoods. These vectors then define a thesaurus by associating each word with its nearest neighbors.

An example of some of the associations found using the Tipster category B corpus are:

accident repair; faulty; personnel; accidents; exhaust; equipped; MISHAPS; injuries; sites advocates passage; PROPONENTS; arguments; address; favoring; compromise; congress; favors; urge litigation LAWSUITS; audit; lawsuit; file; auditors; auditor; suit; sued; proceedings tax taxes; income tax; new tax; income taxes; taxpayers; incentives; LEVIES; taxpayer; corporate taxes treatment drugs; syndrome; administered; administer; study; administering; PROCEDURE; undergo; aids Each row displays a word and its nine nearest neighbors. For example, "repair" is the nearest neighbor of "accident". Word pairs used as terms are displayed without being separated by a semicolon. Words in upper case are hand selected synonyms as might be found in a manually constructed thesaurus. They are particularly interesting because they are unlikely to co-occur with their mates and hence illustrate that this thesaurus construction effectively uses second-order co-occurrence (sharing neighbors in the corpus) rather than simple first-order co-occurrence (occurring next to each other) to find synonyms.

The second preferred embodiment uses the computed thesaurus vectors to perform a search for relevant documents. To use this information directly in the search, a similar representation for documents is needed. The document vectors that are computed are called "context vectors." The simplest approach is to represent each document by a vector, which is the sum of the thesaurus vectors for the words in its text. Formally, $$\vec{d_j} = \sum_i w_{ij} \vec{v_i} \quad (15)$$

where $\vec{d_j}$ is the vector for document j; $w_{ij}$ is the weight for word i in document j; and $\vec{v_i}$ is the thesaurus vector for word i. Queries may be represented as vectors by using equation 15.

An example of weighting the words in the document is by using an augmented tf.idf method (term frequency-inverse document frequency method) when summing thesaurus vectors:

$$w_{ij} = \left( 0.5 + 0.5 * \frac{tf_{ij}}{\max_i(tf_{ij})} \right) * \log\left( \frac{N}{n_i} \right) \quad (16)$$

where $tf_{ij}$ is the frequency of word i in document j; N is the total number of documents; and $n_i$ is the document frequency of word i. As the word frequency increases in a document, the weight (score) for that word also increases. However, the term $N/n_i$ is inversely proportional to document frequency such that high frequency words receive less weight.

For example, the frequency of the word "the" is high for a document. Therefore, this word has a high weight for the document. However, this word occurs in almost every document of the corpus. Thus, the weight of the word drops because it has a low inverse document frequency.

The context vectors $\vec{d_j}$ depend only on the underlying thesaurus vectors. Thus, this method is automatic. The document vectors are a derivation from the corpus. Therefore, the chances that the representations are tuned to the relevant topics increases.

Figure 10:
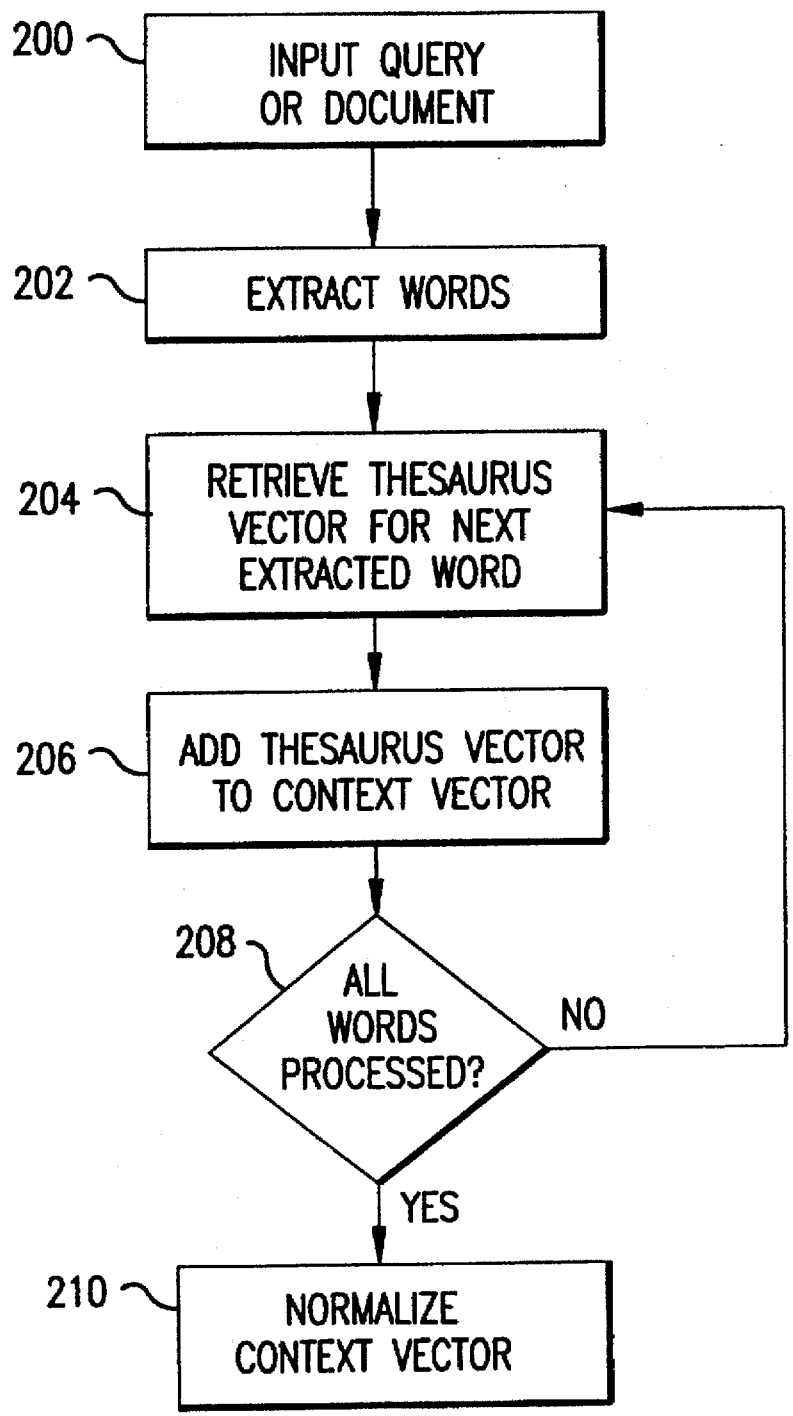
FIG. 10 is a flow diagram for computing context vectors for documents.

FIG. 10 shows the process of computation of context vectors. In step 200, the query or document is loaded into the processor 16 (see FIG. 1). All of the words in the query or document are extracted in step 202. In step 204, the thesaurus vector is retrieved for the first word extracted. The thesaurus vector is added to the context vector for the document in step 206. If there are more words to process from the document, then the flow returns to step 204 to retrieve the thesaurus vector for the next word. If all the words are processed in step 208, then the context vectors are normalized in step 210. The equation to normalize the context vector is:

$$\vec{d_j} = \frac{\vec{d_j}}{\sqrt{\sum_{j=1}^{p} (d_j)^2}} \quad (17)$$

where p is the number of dimensions in the reduced space; and $\vec{d_j}$ is the context vector. By normalizing the context vectors, all of the context vectors will have the same length regardless of the size of the document.

Figures 11, 13:
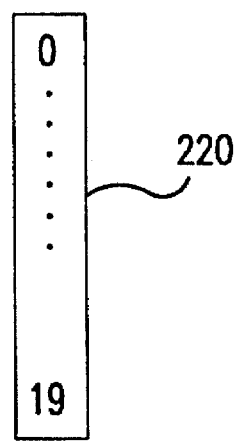
FIG. 11 shows a document context vector.
FIG. 13 shows the memory locations for the ranking of documents.

FIG. 11 shows the normalized context vector for the query or document. Each context vector has 20 real-valued dimensions.

Figure 12:
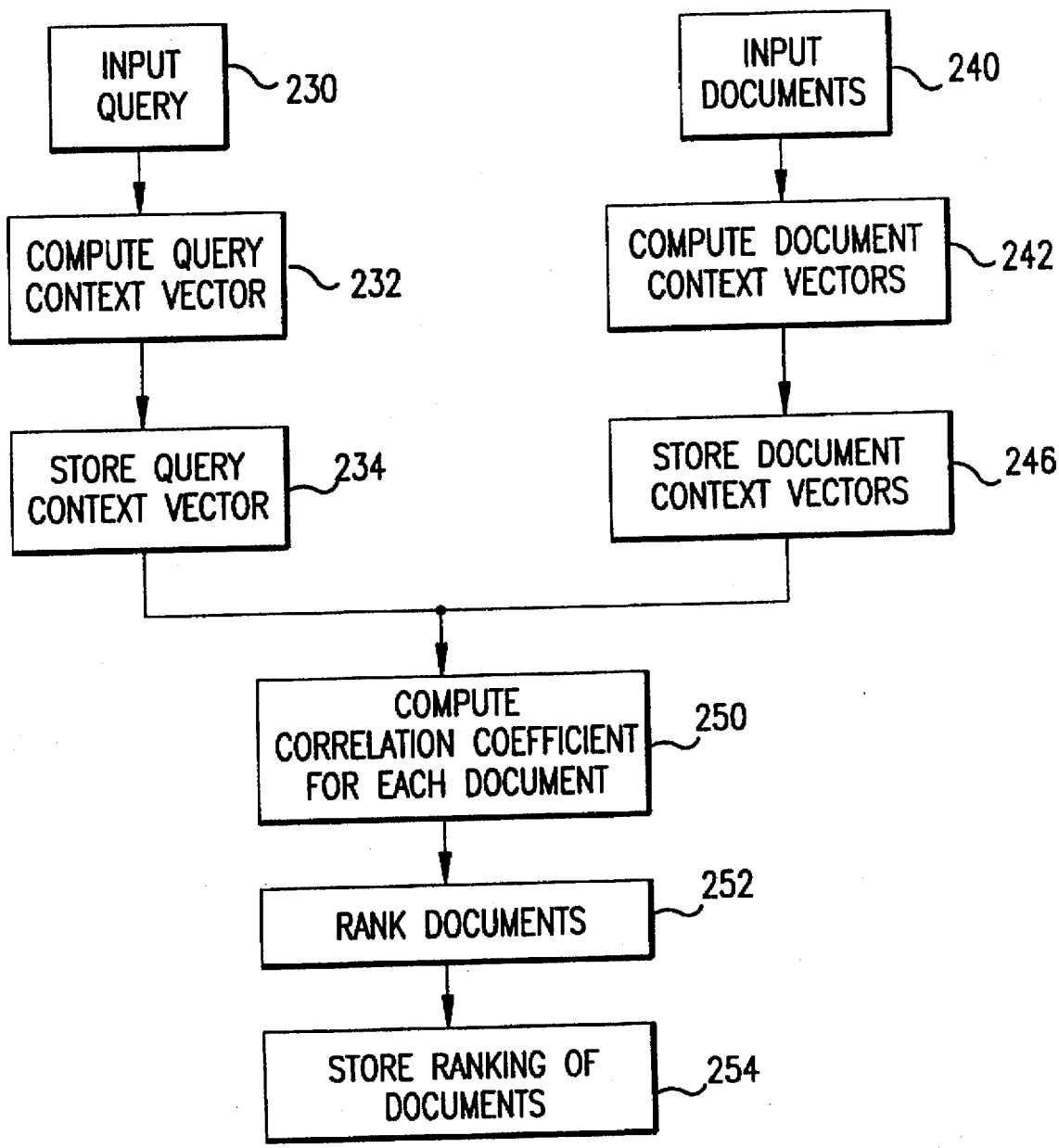
FIG. 12 is a flow diagram for ranking the documents based on the query context vector and the document context vectors.

FIG. 12 shows the process of using context vectors to retrieve relevant documents for a query. In step 230, a query is entered into the processor by the user. The processor computes the context vector for the query in step 232 using the flow diagram of FIG. 10. The computed context vectors are stored by the processor in step 234. The documents are retrieved by the processor in step 240. This step can be performed before or in parallel with the query processing. The context vectors for each document are computed in step 242. The context vectors for each document are stored in RAM or a permanent storage system in step 246 to be used for additional searches.

In step 250, the correlation coefficient is computed based on the context vector of the query and the context vectors of the corpus of documents. The correlation coefficient is computed using the cosine function described earlier (see equation 3). However, the denominator is equal to one. Thus, the equation for the correlation coefficient is:

$$corr(d_i, d_j) = \sum_{k=1}^{p} \psi(d_i)_k \psi(d_j)_k \quad (18)$$

where $d_i$ is the query vector and $d_j$ is the document vector.

After calculating all of the correlation coefficients, the documents are ranked in step 252 from most relevant to least relevant. The ranking can be displayed on the monitor or printed on the printer. In the alternative, the ranking can be stored in a RAM or permanent storage device. Referring to FIG. 13, each memory location stores the rank, the document identification and the correlation coefficient.

The process described in FIG. 12 was performed using the Tipster category B corpus, which has over 450,000 unique terms from about 173,000 Wall Street Journal articles. The context vectors were computed for the 25 Category B topics of the Tipster collection. For each query, documents were ranked according to vector similarity as computed by the correlation coefficient and precision/recall statistics collected. The results of the invention were compared against a baseline standard vector space similarity search with augmented tf.idf term weighting.

To achieve better results than previous methods, schemes that combine the scores from the tf.idf baseline and context vectors was used. Formally, document ranks of the form are considered:

$$r' = \alpha * r_{tf.idf} + (1-\alpha) * r_{cv} \quad (19)$$

where $r_{cv}$ is the context vector rank; $r_{tf.idf}$ is the tf.idf rank; and $\alpha$ is a free parameter between 0 and 1.

Figure 19:
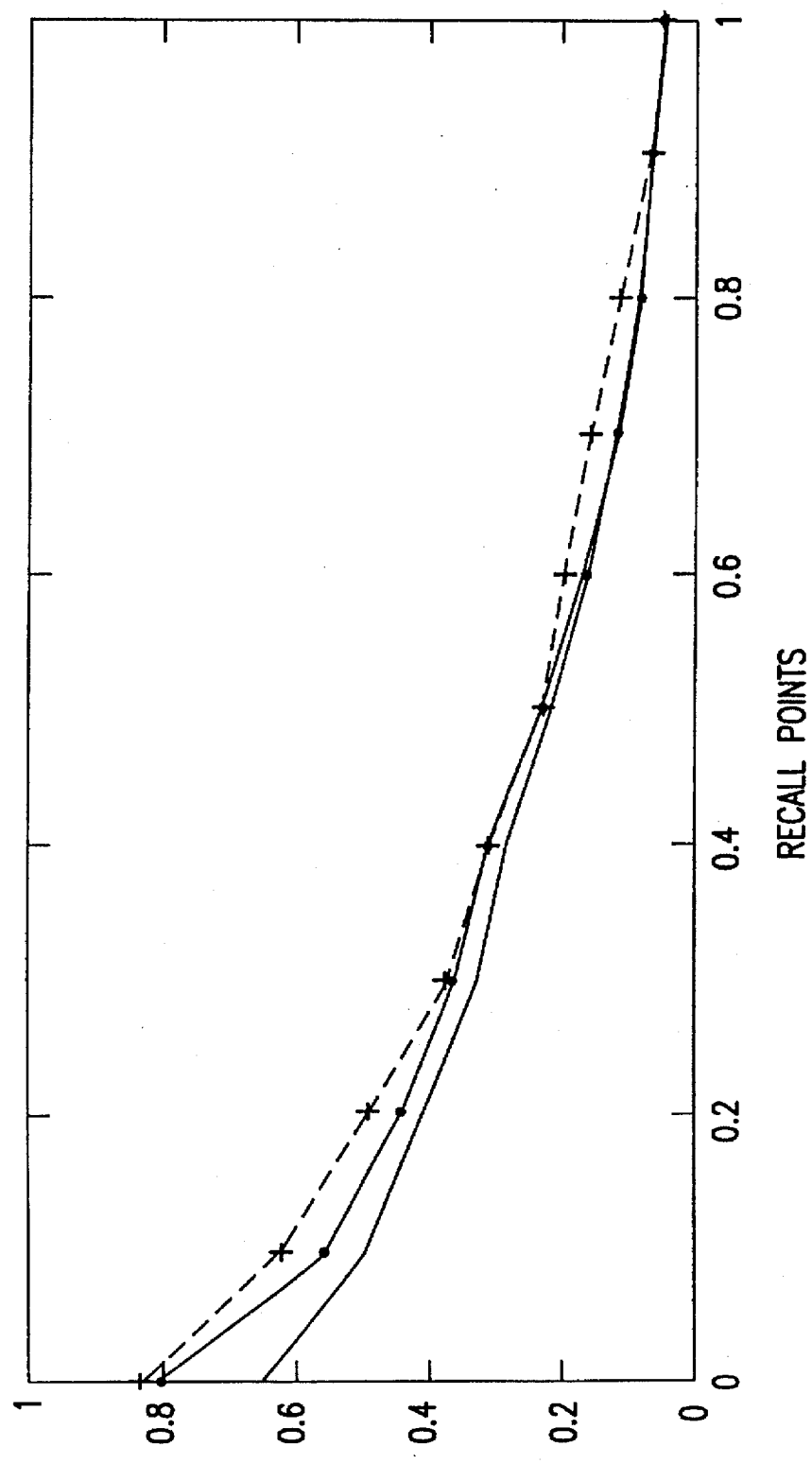
FIG. 19 is a graph showing the precision points computed by the context vector and the factor cluster vector methods.

FIG. 19 shows a precision graph for 11 points of recall. First, a search is performed to retrieve possibly relevant documents. The documents are analyzed to determine the number that are actually relevant to the query. The precision of the search is the ratio of the number of relevant documents to the number of retrieved documents. The recall of the search is the ratio of the number of relevant documents to the number of relevant documents in the corpus. Thus, as the recall of the search is increased, the precision of the search decreases.

In the graph of FIG. 19, the bottom line uses the recall points for tf.idf. The middle line uses the recall points for linear combination for the optimal choice of α, which is 0.7. Thus the average precision for tf.idf is 0.271 and the average precision for the linear combination of tf.idf and context vectors is 0.300. The top line are the recall points for word factorization method, which will be described next.

A third preferred embodiment uses the thesaurus vectors to analyze the query into topic-coherent word groups, which are called word factors. The goal is to ensure that documents are relevant to the entire query such that their score with respect to each factor is high. In addition, word factors may be manually screened for relevance. Word factors containing nuisance or non-topical terms can be deleted from the query.

Figure 14:
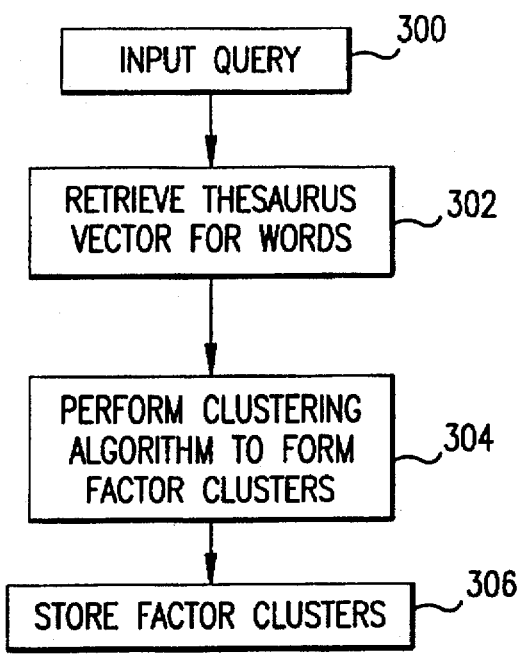
FIG. 14 is a flow diagram for forming factor clusters of document vectors.

FIG. 14 shows the process for query factorization. In step 300, the query is input into the processor. The processor retrieves the thesaurus vectors for the words in the query in step 302. These retrieved thesaurus vectors can be temporarily stored in the RAM. A clustering algorithm is used in step 304 to cluster the retrieved thesaurus vectors based on different topics or factors. The clustered vectors are stored in the RAM in step 306 according to the relevant factor.

Figure 15:
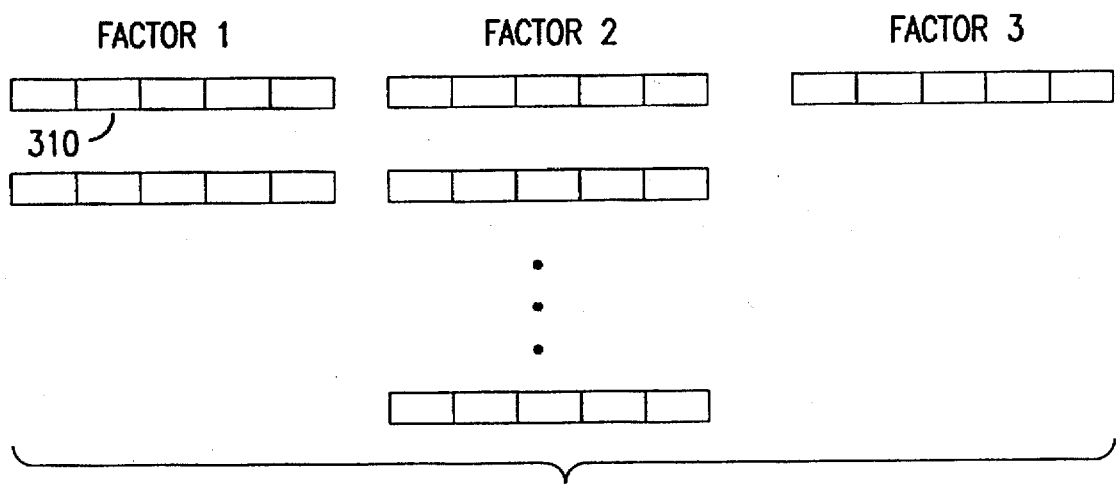
FIG. 15 shows the memory locations for the factor clusters.

In FIG. 15, the memory locations are divided into factors. The document vectors 310 are assigned to the relevant factor and stored.

Figure 16:
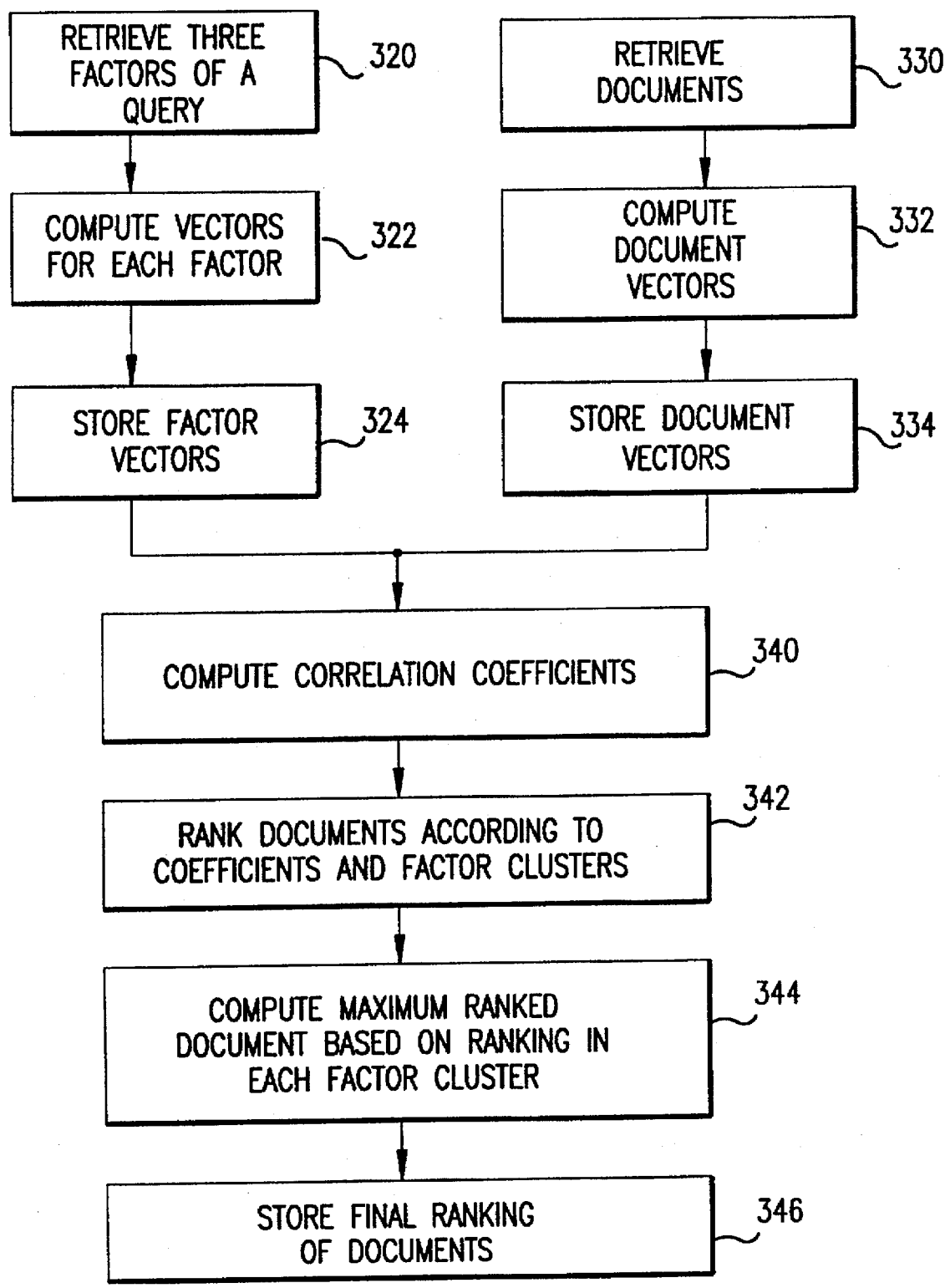
FIG. 16 is a flow diagram for ranking the document vectors based on the factor clusters.

FIG. 16 shows the retrieval of documents using the word factor method. In step 320, the three factors of the query computed by the process shown in FIG. 14 are retrieved. The factor vector for each factor cluster is computed in step 322. The factor vectors for each factor cluster are generated using the following equation:

$$\vec{f_m} = \sum_i w_{im} \vec{v_i} \qquad (20)$$

where $\vec{f}_m$ is the factor vector for cluster m; $w_{im}$ is the weight for word i in cluster m; and $\vec{v}_i$ is the thesaurus vector for word i. The factor vectors are stored in step 324.

In step 330, the documents of the corpus are retrieved into the processor. The document vectors for each document are computed in step 332 by using equation 15. The document vectors are stored in step 334. In step 340, the correlation coefficients between the computed document vectors and the factor vector are computed by using the following equation:

$$corr(f_m, d_j) = \sum_{k=1}^{p} \psi(f_m)_k \psi(d_j)_k \qquad (21)$$

where $\psi(f_m)$ is the factor vector for factor cluster $f_m$ and $\psi(d_j)$ is the context vector for document $d_j$.

In step 342, the documents are ranked based on the correlation coefficient assigned and the appropriate factor. The ranking of the documents within a factor is based on correlation:

$$corr(f_m, d_j) \qquad (22)$$

The rank of $d_j$ according to this ranking is $r_m(j)$; and $corr(f_m, d_j)$ is the correlation of factor m and document j.

FIG. 17 shows the memory divided into sections for each factor. In each section, the documents are ranked from highest to lowest. Each factor rank is associated with the document identification and the correlation coefficient.

In step 344, the documents are ranked based on the maximum rank of the factors. Thus each document is ranked based on the ranking in each factor by using the equation:

$$r(j) = \max_m(r_m(j)) \qquad (23)$$

where r(j) is the ranking of document j; and $r_m(j)$ is the rank of document j for factor cluster m. This algorithm corresponds to imposing a boolean constraint on the subtopics of a query.

The result of the maximum rank is stored in step 346 of FIG. 16. The memory locations of the final ranking is shown in FIG. 18. The highest ranking document is most relevant to the query. The memory lists the rank, the result of the maximum ranking of equation 23, and the document identification number.

Query factorization was used to retrieve relevant documents dealing with trade conflicts between the United States and European countries on subsidies to the aircraft industry. A group average agglomerative clustering was used to group query terms into factors based on their thesaurus vectors. Each topic was clustered into three word factors. All directly juxtaposed words occurring at least five times in the corpus were used as terms.

international politics-aid, assistance, british, code, complaint, consortium, controversy, douglas, economics, european governments, financing, french, german, government assistance, governments, international economics, loan, objection, petition, policy review, producer, retaliation, review, sanctions, spanish, spanish government, tension the aircraft industry-aeronauticas, aeronauticas s.a, aerospace, aerospace plc, aerospatiale, airbus, airbus industrie, aircraft, aircraft consortium, blohm, boeing, boelkow, boelkow blohm, british aerospace, construcciones, construcciones aeronauticas, douglas corp, european aircraft, gmbh, mcdonnell, mcdonnell douglas, messerschmitt, messerschmitt boelkow, plc, s.a trade conflicts-airbus subsidies, anti dumping, countervailing, countervailing duty, dumping, dumping duty, federal subsidies, gatt, general agreement, review group, subsidies, tariffs, trade dispute, trade policy, trade tension One outstanding problem of similarity search is that it treats search terms as if they were in one large disjunction. By scoring each factor separately and recombining them appropriately, documents are scored highly on all factors, and thus introduce a conjunctive constraint.

For example, a document may score high for a query as a whole although it deals with only one of the subtopics of the query. Many high-scoring documents are about the aircraft industry without mentioning trade conflicts or international politics. Instead of evaluating the query as a whole, each subtopic should be evaluated individually and the results combined. If a document is irrelevant to one of the important subtopics of the query, then it often is irrelevant as a whole. For example, a document on the aircraft industry without any mention of trade is irrelevant.

The second goal of word factorization is to eliminate irrelevant words semi-automatically. Many words in the Tipster topic descriptions are not relevant for the query in question, but they should not be placed on a stop list either because they could be relevant for other queries. For example, topic description 75 is about failed or successful automation. The topic is identified as belonging to the general area of "Science and Technology". Therefore, "science" is one of the terms of the query. However, it is not relevant for the query. One of the word factors of the topic 75 is the following:

failed; instance; force; conversely; science

This word factor doesn't contain good search terms and was therefore not used in retrieval. The decision whether a word factor was relevant or not was made manually. The word factors that were judged relevant were then combined according to the algorithm described above.

Referring to FIG. 19, a linear combination of tf.idf and context vectors to evaluate document rank with respect to each factor proved superior to using either method on its own (average precision 0.308 for ranking based only on tf.idf, 0.287 for a ranking based only on context vectors). The top line in FIG. 19 shows the precision for 11 recall points for $\alpha=0.86$. Average precision is 0.3218. This is a five percent improvement over the tf.idf result of 0.271.

Although the invention has been illustrated with particularity, it is intended to be illustrative of the preferred embodiments. It is understood that the disclosure has been made byway of example only. Numerous changes in the combination and arrangements of the parts, steps and features can be made by those skilled in the art without departing from the spirit and scope of the invention, as hereinafter claimed.

APPENDIX A

The ten highest ranking documents for the query average are:
- bank fund and cd yields are lower for fifth week
- money fund and cd yields drop for 4th straight week
- bank yields on certificates of deposits fall narrowly
- cd and bank yields mixed during week
- adds 1973 data; drops repeated figures for 1974–6.
- cd and bank fund yields continue to decline
- bank funds, cd's mixed for week
- cd yields off a 10th week; savings units' rates mixed
- yields on cds and money market accounts fall for 9th week
- yields on cds and money market accounts fall for 9th week The ten highest ranking documents for the query Eschenbach are:
- the recorded legacy of leonard bernstein
- music world pays tribute to leonard bernstein
- mostly mozart to open with one-act opera
- maurice gendron, french cellist and conductor, dies at 69
- san francisco plans festival for mozart's bicentenary
- daniel guilet, violinist, is dead; beaux arts trio founder was 91
- hollywood bowl will create second orchestra
- bernstein retires, citing poor health
- some riffs on a dream jazz festival
- richard lewis, tenor, dies at 76; sang baroque and modern works The ten highest ranking documents for the query gill are:
- vandal vessels invade the atlantic
- summer anglers take note
- driven from pacific, asian driftnet fishermen now ply atlantic
- 'red snapper' shortage possible within 5 years
- for release tuesday, sep. 18
- japanese drift-net fishers face protest from conservationists
- the keys to success for the saltwater fly fisherman
- dried arrangements
- outdoors: atlantic bonito are swift and strong
- battle to preserve florida reef intensifies The ten highest ranking documents for the query Indonesians are:
- vietnamese pay a high-level visit to china
- khmer rouge moves thousands of refugees into malarial 'liberated
- conflict between u.s. and asia over boat people intensifies
- asian nations criticize u.s. refugee policy
- boat people's plight seen as likely to worsen
- beijing and singapore agree to set up diplomatic links
- beijing on a diplomatic roll
- former dissident in mainland china now facing charges in taiwan
- rivals shun conference
- end to cambodian killing fields could begin in hanoi this weekend The ten highest ranking documents for the query markup are:
- supermarkets now sell the space on their shelves
- lucky stores to offer home grocery delivery
- now fewer firms are chasing small investors
- retailers adapt sales strategies to uncertainties of holiday season
- detroit responds to rental-car challenge
- liz claiborne sets discount increase
- wal-mart set to buy discount club chain
- hypermarkets not generating whopping sales
- upgraded image helps penney's bring in shoppers
- g.m. sets incentive offer on many of its 1991 models The ten highest ranking documents for the query Novell are:
- tandy introducing home computer
- hitachi plans hewlett chip
- amdahl posts 41 percent profit gain
- ashton-tate sells software product
- unix pact disclosed
- apple extends adobe license
- mips forecasts possible deficit
- new sun printer and software
- consortium's new software
- ask computer acquires ingres corp.

The ten highest ranking documents for the query pleaded are:
- federal judge aguilar sentenced to six months prison
- ex-juror in goland election-fraud trial accused of offering to rig
- former teamster leader guilty of conspiracy with federal judge
- the various charges in the marcos trial
- jury to be asked about camarena news articles
- federal judge is given reduced jail term in corruption case
- plea bargain falls through for drug defendant
- victim's family rejects bensonhurst deal
- los angeles: evidence in the case.
- barry's lawyers, federal prosecutors begin talks on plea bargain The ten highest ranking documents for the query rags are:
- the three-handkerchief men unseen traveling companions under the sun and out of it, too sparkle for the ears commentary: marble vases, gloria steinem and mary kay rockers turn their garb into garble now that fall's here, it's time for haute couture printed overalls, for when paris sizzles 'gone with the wind' mural continues artist's heritage what's haute is haute The ten highest ranking documents for the query shriveled are:

lustau reserva light fino sherry, solera jarana; about $8.

on the politics of green-bean cookery slow-cooked seasonal fare: a reason for fast-paced cooks to stew?

undated: communal baths.

summer's still warm at greenmarkets there's yumi, and there's yucky yogurt a pennsylvania tradition: the soft pretzel those great old decadent delicious diners!

the ethnic varieties of the urban pickle when whatever goes in the pot is whatever's in the pantry The ten highest ranking documents for the query Societies are:

pope issue key document on roman catholic higher education churches, s.f. mayor begin new push to enlist aids volunteers leader of eastern orthodox christians begins visit to u.s.

leader of easter orthodox christians begins visit to u.s.

interfaith effort aims to ease children's suffering interfaith effort aims to ease children's suffering blahoslav s. hruby, presbyterian minister, dies at 78 rabbi kelman, leader of conservative judaism, dies at 66 greek orthodox group wants to permit married bishops vatican, jewish groups see need to fight anti-semitism in east

TABLE 1

| word | nearest neighbors |
| --- | --- |
| average | averages lowest ratio precent percentage averaging per |
| Eschenbach | orchestra Muti Orchestra orchestras Riccardo symphony |
| gill | net fishermen fishing fishery fisheries fisherman fished |
| Indonesians | Indonesian Indonesia Timorese Thais Kong Hong Malaysian |
| markup | markups sells customers sell buying buys customer salespeople |
| Novell | ncr Com Manzi Kodak ibm Cowen Quist Hambrecht Lotus |
| pleaded | guilty plead felony plea pleads conspiring felonies conspiracy |
| rags | hat neatly neat beside hangs lit tall rag fake gaze eyed cowboy |
| shriveled | lean thin spiked soft plain dips into bursting bite appetites |
| Societies | societies Society social fraternal society auspices fostering |

TABLE 2

| retrieval vector | nearest neighbors |
| --- | --- |
| tank + artillery | tanks tank artillery armor howitzers armored ammunition |
| tank + water | pipes water tank flush ocean reservoir shore underwater |
| coast | Coast coastline coastal Ocean shore ashore inland sea coasts |
| expensive | inexpensive/-ly expense prohibitively cheaper dispensing costlier extensions costly costing |

TABLE 3

| article | title |
| --- | --- |
| 132 | experimental vaccine protects chimps against aids infection |
| 13609 | kathleen brown wants to be governor, not treasure, hayes aide says |
| 14387 | israeli intelligence says palestinians planning attacks against |
| 22872 | corning, n.y.: and engineers (Corning's affirmative action program) |
| 27081 | income-tax package may not be as unbalanced as it seems |
| 4579 | a low-fat mean for holiday outings |

TABLE 4

| article | nearest neighbors |
| --- | --- |
| 132 | causes injecting defect onset dose injected cure cause commonly prolong |
| 13609 | has part reputation been for could also made no Mr |
| 14387 | calling termed offical American refrain swiftly provoked persuade besieged disrupt |
| 22872 | also part other has many more others from an most |
| 27081 | would thereby coupled also gap under bulk new than sum |
| 4579 | eggs mix bean soda mixing nuts egg jar slice beef |

I claim:

1. A method, using a processor and memory, for generating a thesaurus of word vectors based on lexical co-occurrence of words within documents of a corpus of documents, the corpus stored in the memory, the method comprising:

retrieving into the processor a retrieved word from the corpus;

recording a number of times a co-occuring word co-occurs in a same document within a predetermined range of the retrieved word;

repeating the recording step for every co-occurring word located within the predetermined range for each occurrence of the retrieved word in the corpus;

generating a word vector for the word based on every recorded number;

repeating the retrieving, recording, recording repeating and generating steps for each word in the corpus, and storing the generated word vectors in the memory as the thesaurus.

2. The method of claim 1, wherein a matrix of word vectors is formed using all of the generated word vectors of the corpus.

3. The method of claim 2, wherein forming the matrix comprises the steps of:

forming a first matrix from a first subset of words within the corpus, each element of the first matrix recording the number of times that two words within the first subset co-occur in the predetermined range;

clustering the first matrix into groups to form a set of low coverage word clusters;

forming a second matrix from the low coverage word clusters and a second subset of words within the corpus, the second subset containing more words than the first subset, each element of the second matrix recording a number of times that each word of the second subset co-occurs with each cluster of the set of low coverage word clusters within the predetermined range;

clustering the second matrix into groups to form a set of high coverage word clusters;

forming a third matrix from the high coverage word clusters and all of the words of the corpus, each element of the third matrix recording a number of times that each word of the corpus co-occurs with each cluster of the set of high coverage word clusters within the predetermined range; and reducing dimensionality of the third matrix to represent each element of the third matrix as a compact vector.

4. The method of claim 3, further comprising, before forming the first matrix:

computing word frequency and word pair frequency for the words of the corpus; and removing words and word pairs with low frequency.

5. The method of claim 3, wherein a number of words selected from the corpus to form the first matrix is 3000 words.

6. The method of claim 5, wherein the selected words are medium frequency words.

7. The method of claim 3, wherein the clustering of the first matrix and the second matrix use a Buckshot fast clustering algorithm.

8. The method of claim 3, wherein a clustering algorithm is based on a cosine similarity between columns of the first matrix.

9. The method of claim 3, wherein a number of low coverage word clusters is 200.

10. The method of claim 3, wherein the second subset contains 20,000 words.

11. The method of claim 10, wherein the words within the second subset are the most frequent words excluding stop words.

12. The method of claim 3, wherein the reducing step uses a singular value decomposition method.

13. The method of claim 1, wherein the similarity between two words uses a cosine similarity function of:

$$\cos(w_i, w_j) = \frac{\sum_{k=1}^{|V|} \phi(w_i)_k \phi(w_j)_k}{\sqrt{\sum_{k=1}^{|V|} \phi(w_i)_k^2 \sum_{k=1}^{|V|} \phi(w_j)_k^2}}$$

where V is a set of words; $w_i$ is the word; $w_j$ is the co-occurring word; $\phi$ is a word encoding vector of the word and the co-occurring word.

14. The method of claim 1, wherein the word vector is generated based on:

$$\phi_1(w_i) = \sum_{d_j \in D} \sum_{t_{j,k}=w_i} \sum_{|l-k| \leq W} \phi_0(t_{j,l})$$

where $\phi_1$ is an order-1 vector for word $w_i$; tokens $t_{j,k}$ are unique words in document $d_j$ within the corpus D; tokens $t_{j,l}$ are neighbors of one of the tokens $t_{j,k}$; W is a number of intervening words between tokens $t_{j,l}$ and $t_{j,k}$; and $\phi_0$ is an order-0 vector for tokens $t_{j,l}$.

15. The method of claim 14, wherein the word vector is generated based on:

$$\phi_2(w_i) = \sum_{d_j \in D} \sum_{t_{j,k}=v_n} \sum_{|l-k| \leq W} \phi_1(t_{j,l})$$

where $\phi_2$ is an order-2 vector for word $w_i$; tokens $t_{j,k}$ are unique words in document $d_j$ in the corpus D; $v_n$ is a frequent content word; tokens $t_{j,l}$ are neighbors of one of the tokens $t_{j,k}$; W is a number of intervening words between tokens $t_{j,l}$ and $t_{j,k}$; and $\phi_1$ is an order-1 vector for token $t_{j,l}$.

16. The method of claim 15, wherein the number of intervening words is 50.

17. The method of claim 14, wherein the number of intervening words is 50.

18. The method of claim 1, further comprising generating a context vector for each document of the corpus, the context vector for a document based on the word vectors from the thesaurus for each word located in the document.

19. The method of claim 18, wherein generating the context vector comprises:

extracting each word from the document;

retrieving the word vector from the thesaurus for each extracted word;

adding the retrieved word vectors together to form the context vector for the document.

20. The method of claim 19, wherein the word vectors are weighted before being added together.

21. The method of claim 19 further comprising the step of normalizing the context vector.

22. The method of claim 18, wherein generating the context vector uses the equation:

$$\vec{d_j} = \sum_i w_{ij} \vec{v_i}$$

where $\vec{d_j}$ is the vector for document j; $w_{ij}$ is the weight for word i in document j; and $\vec{v_i}$ is the thesaurus vector for word i.

23. The method of claim 22 wherein weighting the words in the document is by using an augmented term frequency-inverse document frequency method:

$$w_{ij} = \left( 0.5 + 0.5 * \frac{tf_{ij}}{\max_i(tf_{ij})} \right) * \log\left( \frac{N}{n_i} \right)$$

where $tf_{ij}$ is the frequency of word i in document j; N is the total number of documents; and $n_i$ is the document frequency of word i.

24. The method of claim 22, wherein the context vector is normalized using the equation:

$$\vec{d_j} = \frac{\vec{d_j}}{\sqrt{\sum_{j=1}^{p} (d_j)^2}}$$

where p is the number of dimensions in the corpus; and $\vec{d_j}$ is the context vector.

25. A method, using a processor and memory, for determining relevant documents in a corpus of documents, the memory including a thesaurus of word vectors and a context vector for each document, the word vectors based on co-occurrence of words within each of the documents of the corpus of documents and each context vector based on the word vectors from the thesaurus for each word located in the corresponding document, the method comprising:

inputting a query;

generating a context vector for the query based on the word vectors from the thesaurus for each word in the query;

determining a correlation coefficient for each document based on the context vectors for that document and the query;

ranking each document based on the determined correlation coefficients; and outputting the ranking for at least one of the documents.

26. The method of claim 25, wherein computing the correlation coefficient uses the following formula:

$$corr(d_i, d_j) = \sum_{k=1}^{p} \psi(d_i)_k \psi(d_j)_k$$

where $\psi(d_i)$ is the query vector and $\psi(d_j)$ is the document vector.

27. The method of claim 25, wherein ranking of documents is from highest correlation coefficients to lowest correlation coefficients.

28. The method of claim 25, wherein the step of outputting comprises outputting, instead of the ranking for at least one document, at least one document according to its corresponding ranking.

29. The method of claim 25, further comprising outputting at least one document according to its ranking.

30. The method of claim 25, wherein the step of outputting comprises outputting, instead of the ranking for at least one document, at least one document according to its corresponding ranking.

31. The method of claim 25, further comprising outputting at least one document according to its ranking.

32. A method, using a processor and memory, for determining relevant documents in a corpus of documents, the memory including a thesaurus of word vectors and a context vector for each document, the word vectors based on co-occurrence of words within each of the documents of the corpus of documents and each context vector based on the word vectors from the thesaurus for each word located in the corresponding document, the method comprising:

inputting a query;

generating a factor vector for the query based on a clustering of the word vectors of the query;

determining a correlation coefficient for each document based on the factor vector and the context vector for that document;

ranking each document within a factor cluster based on the determined correlation coefficients; and determining a maximum rank of each document based on a combination of the ranks of the documents in each factor cluster; and outputting a final rank for at least one of the documents.

33. The method of claim 32, wherein generating the factor vectors comprises:

retrieving the thesaurus word vectors for each word in the query;

forming factor clusters of the query;

generating a factor vector for each factor cluster.

34. The method of claim 32, wherein generating the factor vector uses the equation:

$$\vec{f}_m = \sum_i w_{im} \vec{v}_i$$

where $\vec{f}_m$ is the factor vector for factor cluster m; $w_{im}$ is the weight for word i in factor cluster m; and $\vec{v}_i$ is the thesaurus vector for word i.

35. The method of claim 32, wherein computing the correlation coefficient for each document uses the following formula:

$$corr(f_m, d_j) = \sum_{k=1}^{p} \psi(f_m)_k \psi(d_j)_k$$

where $\psi(f_m)$ is the factor vector for factor cluster $f_m$ and $\psi(d_j)$ is the context vector for document $d_j$.

36. The method of claim 32, wherein ranking of the documents within a factor cluster is based on correlation:

$$corr(f_m, d_j)$$

where the rank of $d_j$ according to this ranking is $r_m(j)$; and $corr(f_m, d_j)$ is the correlation of factor m and document j.

37. The method of claim 32, wherein computing the maximum rank for each document uses the following equation:

$$r(j) = \max_m (r_m(j))$$

where $r(j)$ is the ranking of document j; and $r_m(j)$ is the rank of document j for factor cluster m.

38. The method of claim 32, wherein the rank of the most relevant document is output.

39. An apparatus for generating a thesaurus of word vectors for each word in a corpus of documents, the word vectors being based on the lexical co-occurrence of words within each of the documents, comprising:

a memory containing the corpus of documents;

an extractor for retrieving a word from the corpus;

a counter recording the number of times the word co-occurs with a co-occurring word located within a predetermined range, the co-occurring word being any word located before and after the word within the predetermined range, the counter recording the number for every co-occurring word within the predetermined range;

a generator generating a word vector for the word based on every recorded number; and an output for outputting the word vectors in the thesaurus.

40. An apparatus for retrieving relevant documents from a corpus of documents based on a query, comprising:

a memory containing the corpus of documents;

a thesaurus of word vectors for each word of the corpus, the word vectors being based on lexical co-occurrence of words within each of the documents;

a processor for generating document vectors and a query vector based on the word vectors, each document vector being a summation of the word vectors that are associated with the words located within the document; the query vector being a summation of the word vectors that are associated with the words located within the query;

determining means for determining a co-occurrence correlation relationship between the document vectors and the query vector; and output means for outputting the relevant documents based on the correlation relationship determined by the determining means.

41. The apparatus of claim 40, wherein the thesaurus comprises:

an extractor for retrieving a word from the corpus;

a counter recording the number of times the word co-occurs with a co-occurring word located within a predetermined range, the co-occurring word being any word located before and after the word within the predetermined range, the counter recording the number for every co-occurring word within the predetermined range; and a generator generating a word vector for the word based on every recorded number.

42. The apparatus of claim 40, wherein the determining means ranks the documents based on the correlation relationship.

43. The apparatus of claim 40, wherein the processing means weights the word vectors before forming the document vectors and the query vector.

44. The apparatus of claim 40, wherein the memory is one of a RAM, a ROM and an external storage unit.

45. The apparatus of claim 40, wherein the query vector is a plurality of query factor vectors, each query factor vector based on a cluster factor of the query.

46. The apparatus of claim 45, wherein the determining means ranks the documents in factor clusters based on the correlation relationship between the document vectors and the query factor vectors of the query vector.

47. The apparatus of claim 46, wherein the relevant documents are determined by combining the ranking of the document within each factor cluster.

* * * * *

(12) EX PARTE REEXAMINATION CERTIFICATE (8054th)
United States Patent
Schuetze

(10) Number: US 5,675,819 C1
(45) Certificate Issued: Mar. 1, 2011

(54) DOCUMENT INFORMATION RETRIEVAL USING GLOBAL WORD CO-OCCURRENCE PATTERNS

(75) Inventor: Hinrich Schuetze, Stanford, CA (US)

(73) Assignee: Xerox Corporation, Stamford, CT (US)

Reexamination Request:
No. 90/010,641, Sep. 23, 2009

Reexamination Certificate for:
Patent No.: 5,675,819
Issued: Oct. 7, 1997
Appl. No.: 08/260,575
Filed: Jun. 16, 1994

(51) Int. Cl.
*G06F 17/27* (2006.01)
*G06F 17/30* (2006.01)

(52) U.S. Cl. ............ 704/10; 704/9; 707/999.003; 707/E17.075; 715/205; 715/206

(58) Field of Classification Search ............ None
See application file for complete search history.

(56) References Cited

U.S. PATENT DOCUMENTS 5,619,709 A 4/1997 Caid et al.

OTHER PUBLICATIONS

Jing, Yufeng, and Croft, W. Bruce, "An Association Thesaurus for Information Retrieval," UM–CS–1994–017, Mar. 1994.
Schütze, H, "Dimensions of Meaning," in Proceedings of Supercomputing '92 (Los Alamitos, CA, 1992), IEEE Computer Society Press, pp. 787–796, 1992.
Gallant, S. I., Caid, W. R., Carleton, J., Hecht–Nielsen, R., Qing, K. P., and Sudbeck, D., "HNC's MatchPlus System," SIGIR Forum 26, 2, pp. 34–38, Oct. 1992.
Grefenstette, Gregory, "Evaluation Techniques for Automatic Semantic Extraction: Comparing Syntactic and Window Based Approaches," in the Workshop for Acquisition of Lexical Knowledge from Text, pp. 143–153, Jun. 21, 1993.
Broglio, J., Callan, J.P. and Croft, W. B., "Inquery System Overview," in Proceedings of A Workshop on Held At Fredericksbury, Virginia, pp. 47–67, Sep. 19–23, 1993.
Crouch, Carolyn J., and Yang, Bokyung, "Experiments in Automatic Statistical Thesaurus Construction," University of Minnesota 15th Annual International SIGIR (Denmark), pp. 77–88, Jun. 1992.
Kimoto, Haruo and Iwadera, Toshiaki, "Construction of a Dynamic Thesaurus and its Use for Associated Information Retrieval," ACM Proceedings of the 13th Annual International ACM SIGIR Conference, pp. 227–240, Dec. 1990.
Schütze, Hinrich, "Word Space," Advances in Neural Information Processing Systems 5, [NIPS Conference], Morgan Kaufmann Publishers Inc. San Mateo, CA, pp. 895–902, 1993.

*Primary Examiner*—B. James Peikari

(57) ABSTRACT

A method and apparatus accesses relevant documents based on a query. A thesaurus of word vectors is formed for the words in the corpus of documents. The word vectors represent global lexical co-occurrence patterns and relationships between word neighbors. Document vectors, which are formed from the combination of word vectors, are in the same multi-dimensional space as the word vectors. A singular value decomposition is used to reduce the dimensionality of the document vectors. A query vector is formed from the combination of word vectors associated with the words in the query. The query vector and document vectors are compared to determine the relevant documents. The query vector can be divided into several factor clusters to form factor vectors. The factor vectors are then compared to the document vectors to determine the ranking of the documents within the factor cluster.

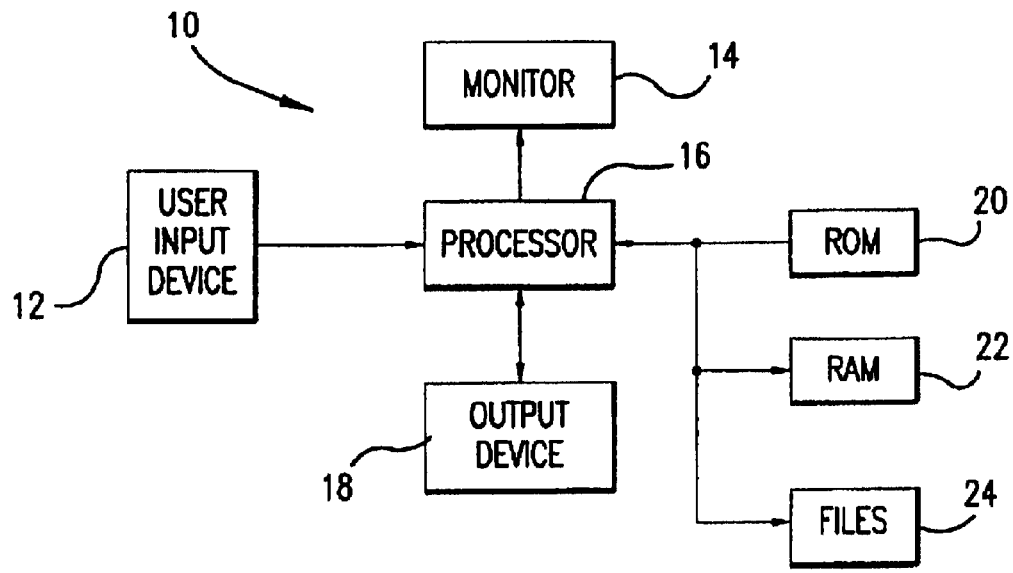

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1, 25, 27, 28 and 31 are cancelled.

Claims 2-24, 26, 29-30 and 32-47 were not reexamined.

\* \* \* \* \*